(12) United States Patent
Catalan

(10) Patent No.: US 11,949,311 B2
(45) Date of Patent: Apr. 2, 2024

(54) ELECTROMAGNETIC HALBACH ARRAY, DEVICES, AND METHODS

(71) Applicant: Roberto Sanchez Catalan, Woodbridge, VA (US)

(72) Inventor: Roberto Sanchez Catalan, Woodbridge, VA (US)

(*) Notice: Subject to any disclaimer, the term of this patent is extended or adjusted under 35 U.S.C. 154(b) by 891 days.

(21) Appl. No.: 16/068,681

(22) PCT Filed: Oct. 26, 2017

(86) PCT No.: PCT/US2017/058609
§ 371 (c)(1),
(2) Date: Jul. 9, 2018

(87) PCT Pub. No.: WO2019/083539
PCT Pub. Date: May 2, 2019

(65) Prior Publication Data
US 2021/0211033 A1  Jul. 8, 2021

(51) Int. Cl.
| | |
|---|---|
| *H02K 41/03* | (2006.01) |
| *H02K 1/12* | (2006.01) |
| *H02K 1/2753* | (2022.01) |
| *H02K 3/28* | (2006.01) |
| *H02K 3/47* | (2006.01) |

(52) U.S. Cl.
CPC ............ *H02K 41/031* (2013.01); *H02K 1/12* (2013.01); *H02K 1/2753* (2013.01); *H02K 3/28* (2013.01); *H02K 3/47* (2013.01)

(58) Field of Classification Search
CPC ........ H02K 41/031; H02K 41/03; H02K 1/12; H02K 1/2753; H02K 3/28; H02K 3/47; H02K 1/278; H02K 1/2783; H02K 1/2792
USPC ....................................... 310/12.29
See application file for complete search history.

(56) References Cited

U.S. PATENT DOCUMENTS

| | | | | |
|---|---|---|---|---|
| 4,701,736 | A * | 10/1987 | McDougall | G01R 33/3806 335/216 |
| 5,631,618 | A * | 5/1997 | Trumper | H01F 7/20 104/286 |
| 7,598,646 | B2 | 10/2009 | Cleveland | |
| 2008/0224557 | A1* | 9/2008 | Cleveland | B62J 6/20 310/156.43 |
| 2008/0265894 | A1 | 10/2008 | Snyder | |
| 2011/0074231 | A1* | 3/2011 | Soderberg | H01F 3/10 335/297 |
| 2012/0091832 | A1* | 4/2012 | Soderberg | C22C 33/02 310/156.01 |
| 2015/0015354 | A1* | 1/2015 | Catalan | H01F 3/10 335/297 |
| 2015/0061440 | A1* | 3/2015 | Catalan | H02K 16/00 310/156.01 |
| 2016/0164353 | A1 | 6/2016 | Catalan | |

* cited by examiner

*Primary Examiner* — Michael Andrews
(74) *Attorney, Agent, or Firm* — Peter Kramer

(57) ABSTRACT

Halbach array of magnetically isotropic electromagnets, comprised of loosely-wound, spring-like nested electromagnetic coils, wound and arranged in close proximity in Halbach array sequence, encased in various combinations of powdered magnetic metal composite and binder, formed, wired, and assembled to serve as a stater and/or rotor of an electric motor or generator.

25 Claims, 15 Drawing Sheets

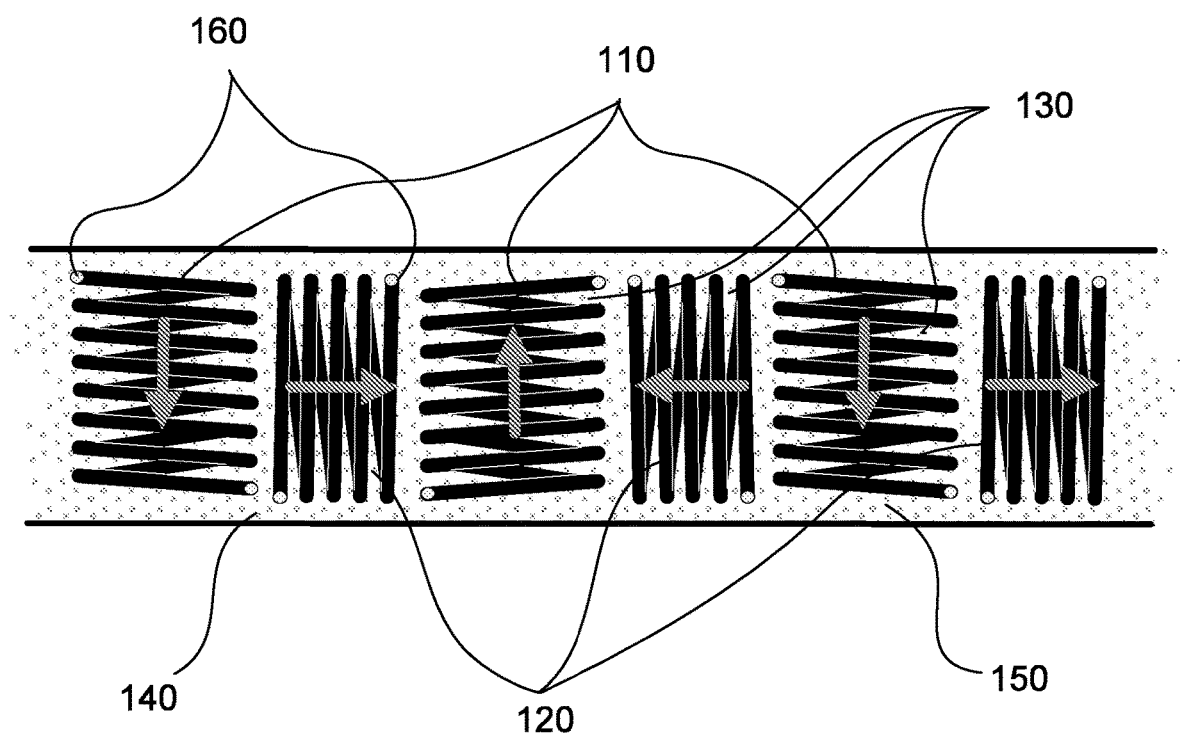
FIG. 1.1

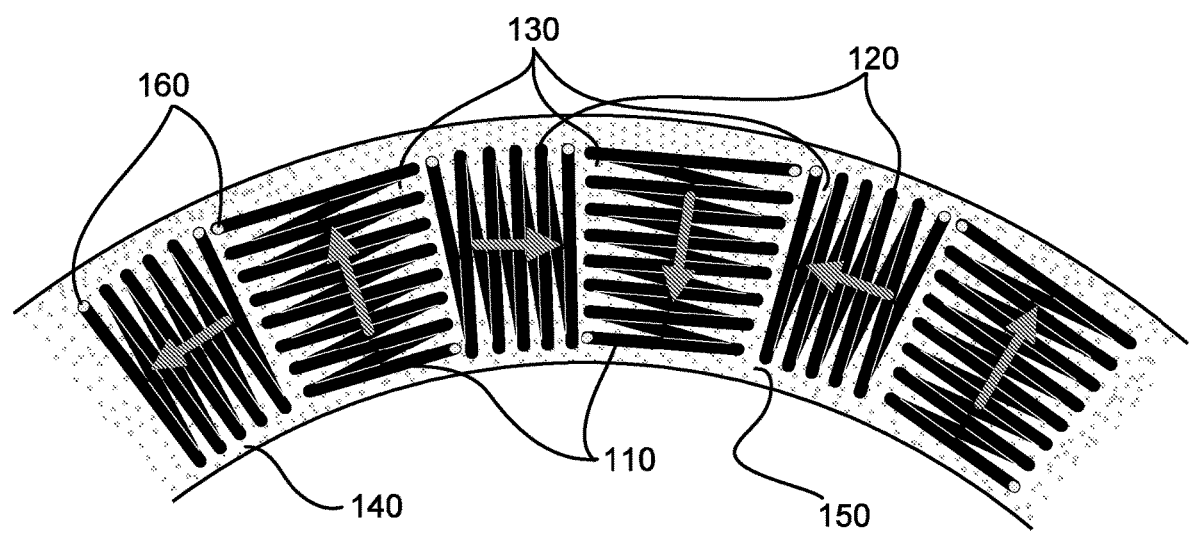
FIG. 1.2

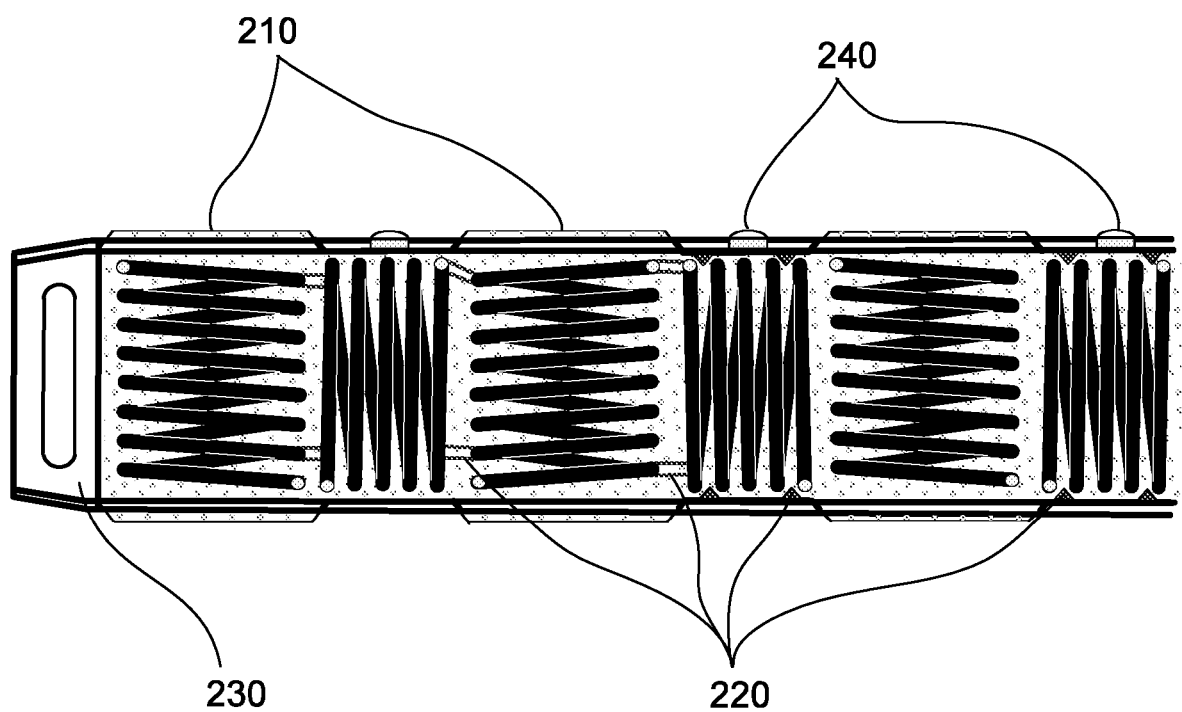
FIG. 1.3

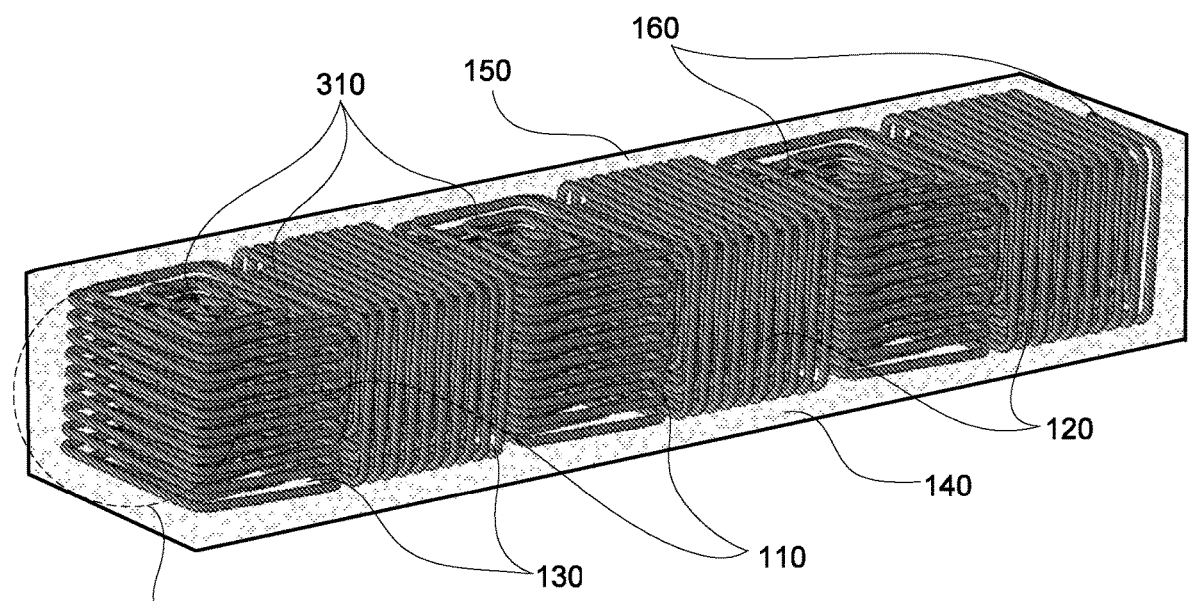
FIG. 2.2
FIG. 2.1

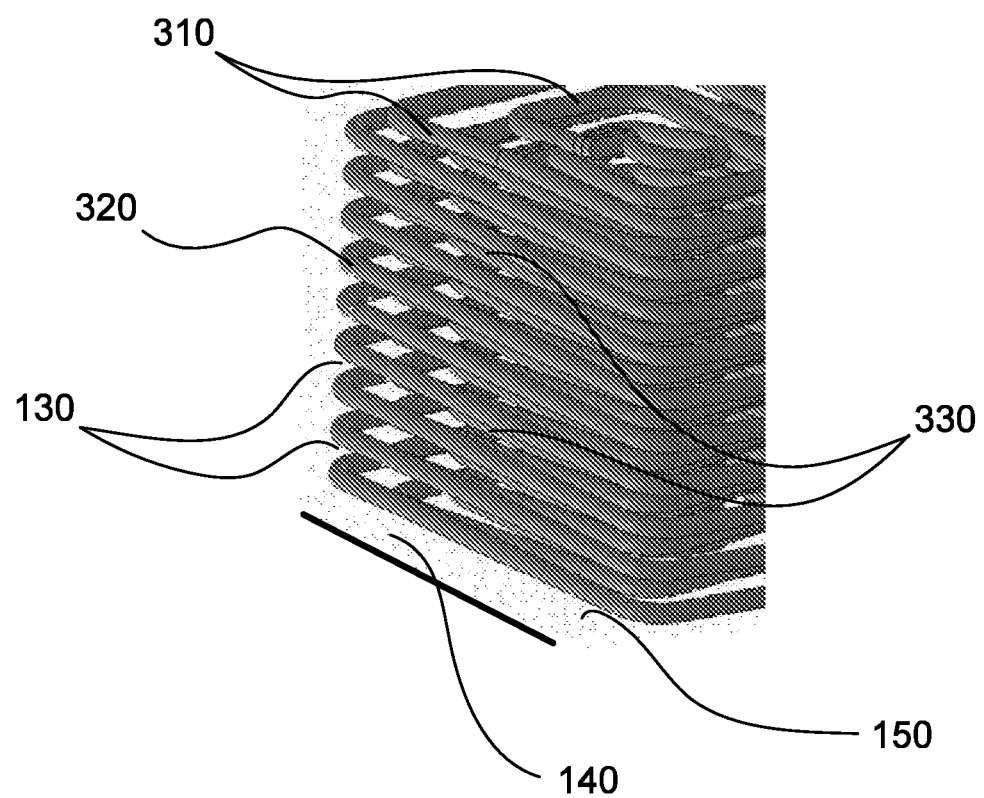
FIG. 2.2

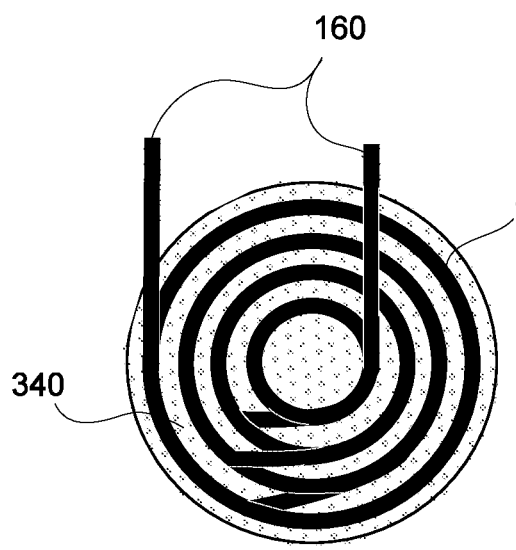
FIG. 3.1
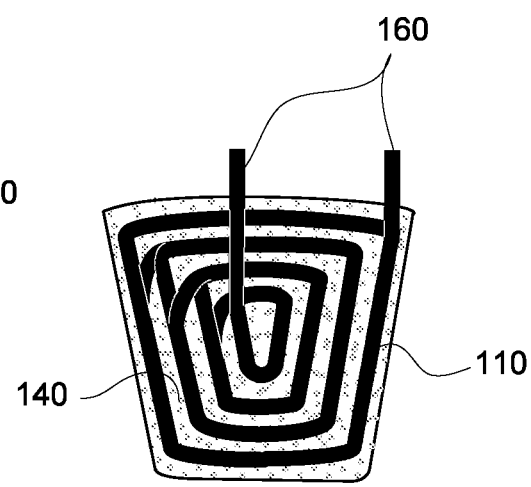
FIG. 3.2
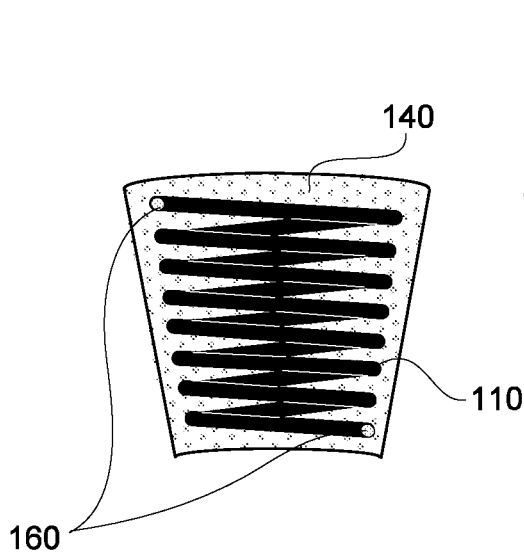
FIG. 3.3
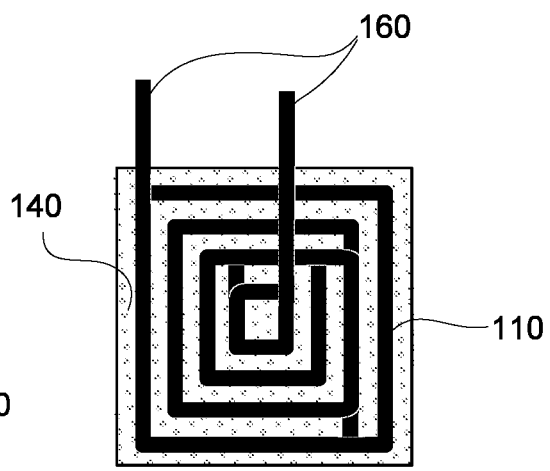
FIG. 3.4

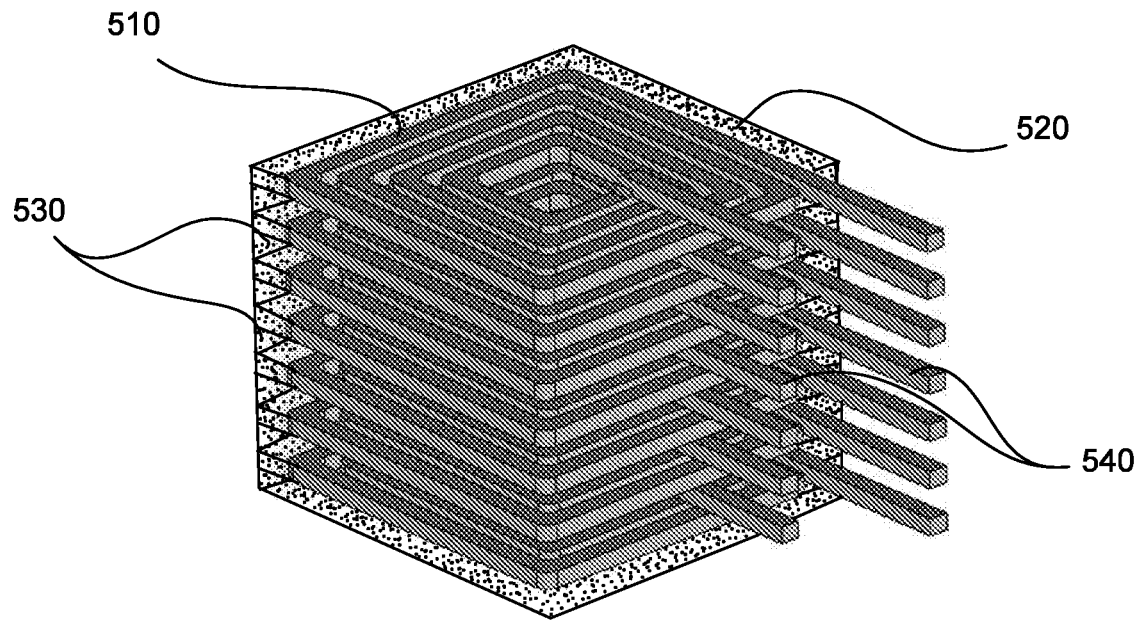
FIG. 5.1
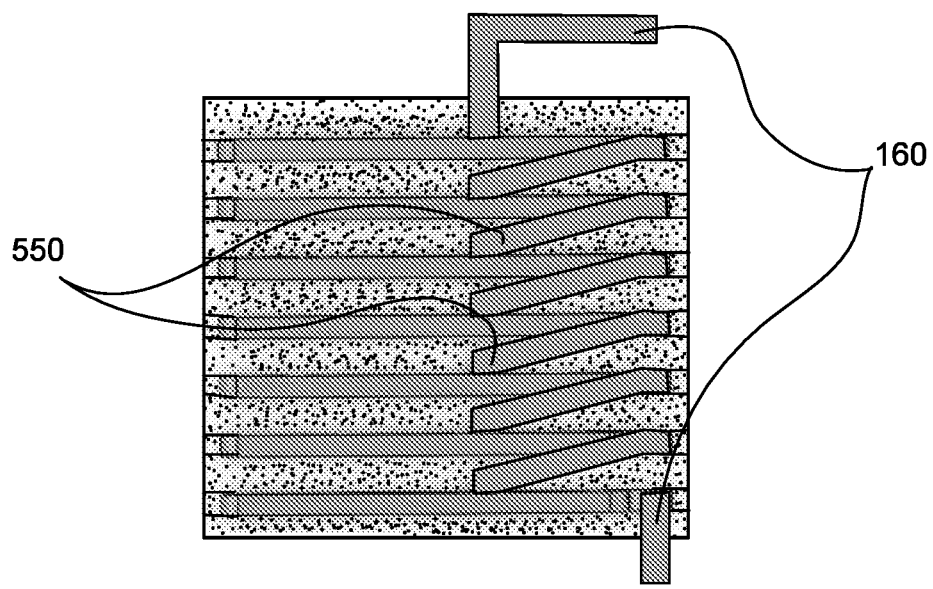
FIG. 5.2

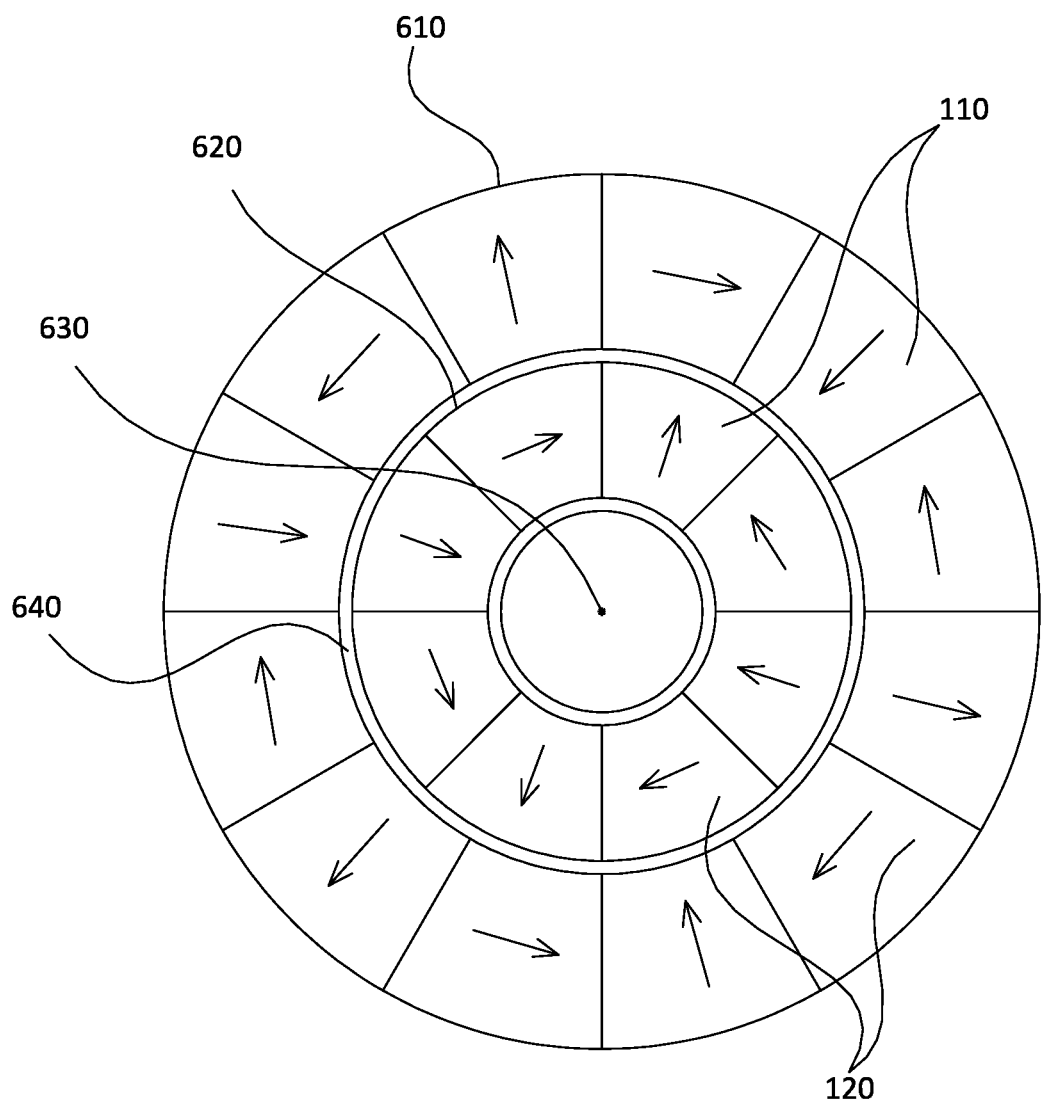
FIG. 6.1

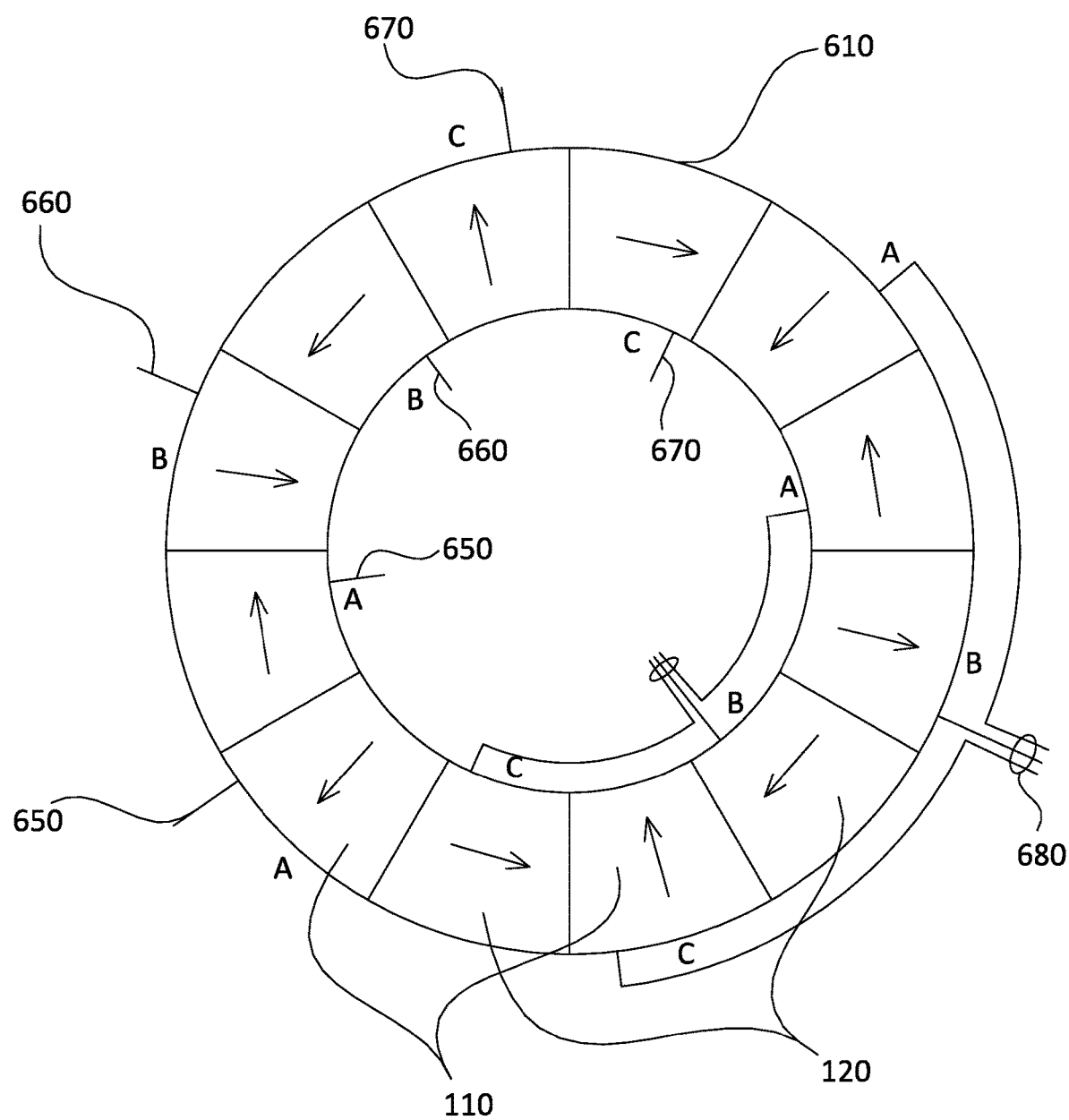
FIG. 6.2

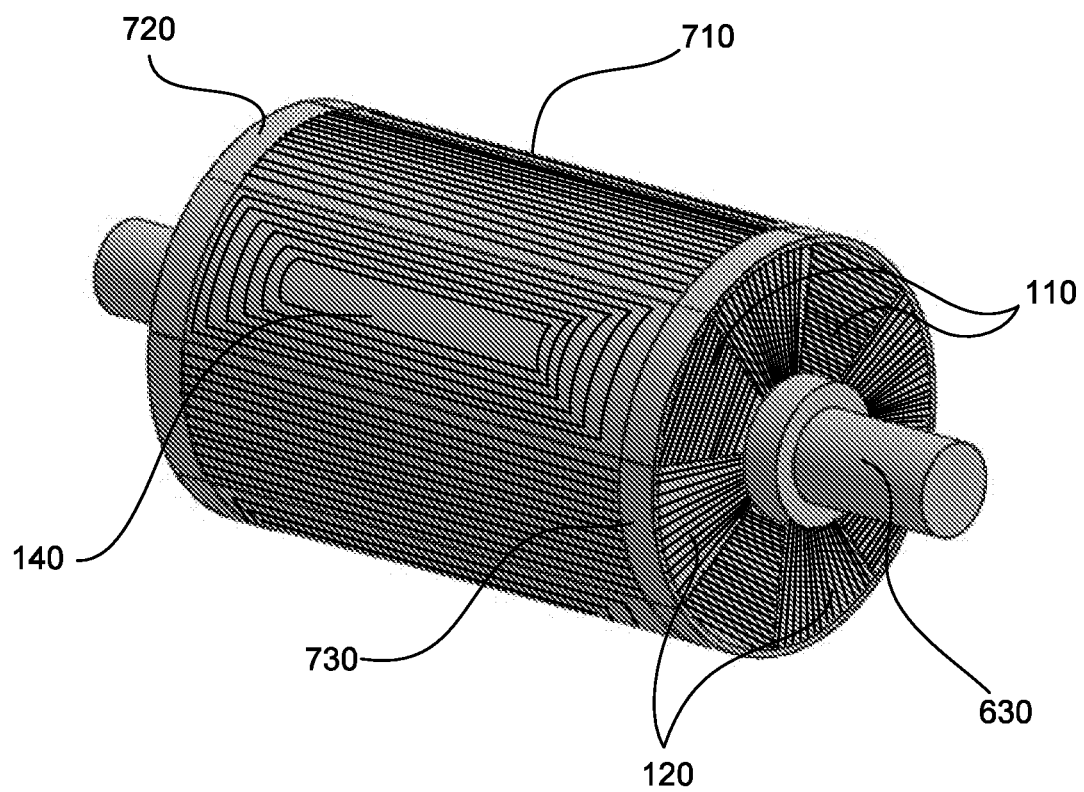
FIG. 6.3

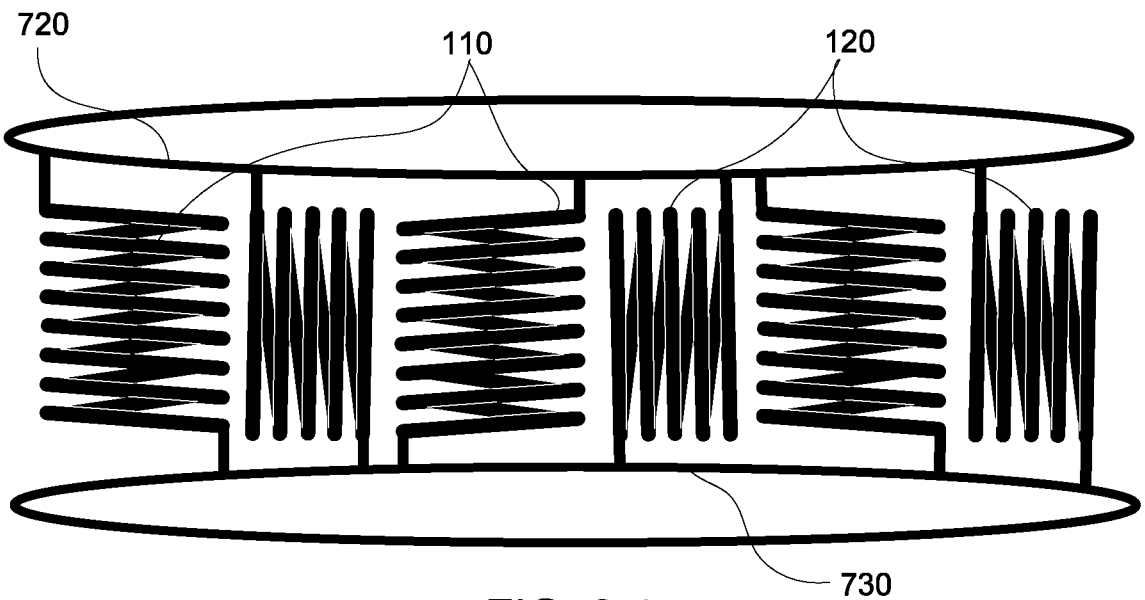
FIG. 6.4
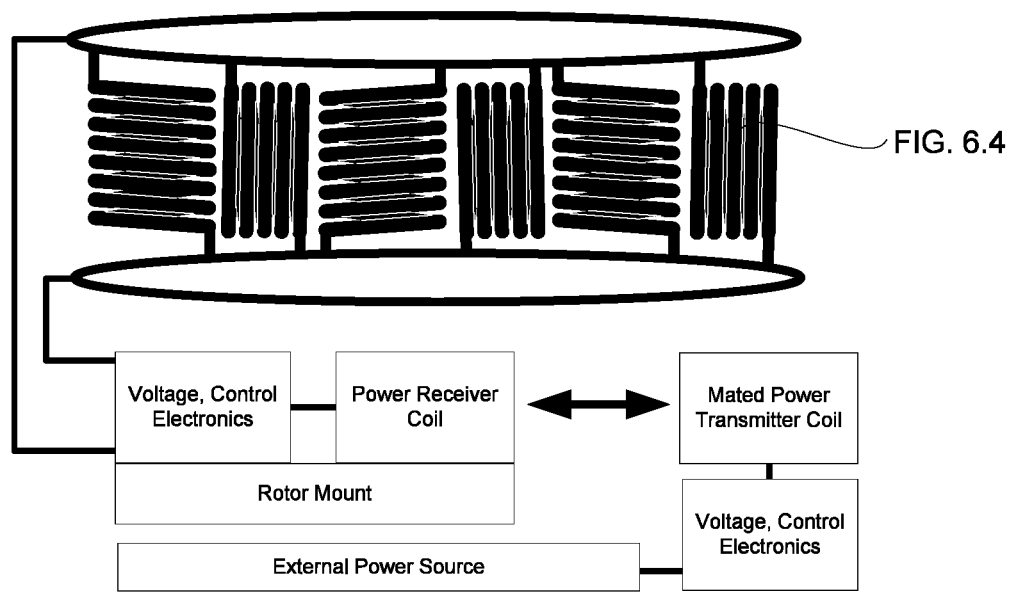
FIG. 6.5

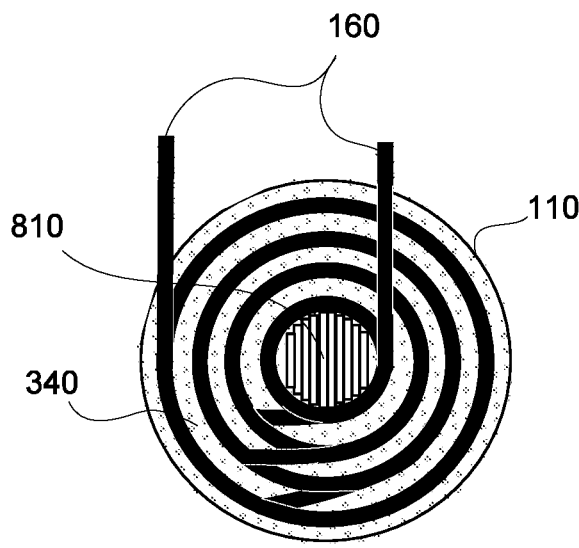
FIG. 7.1
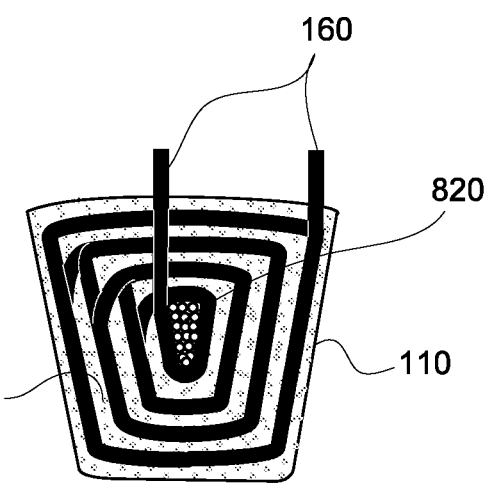
FIG. 7.2
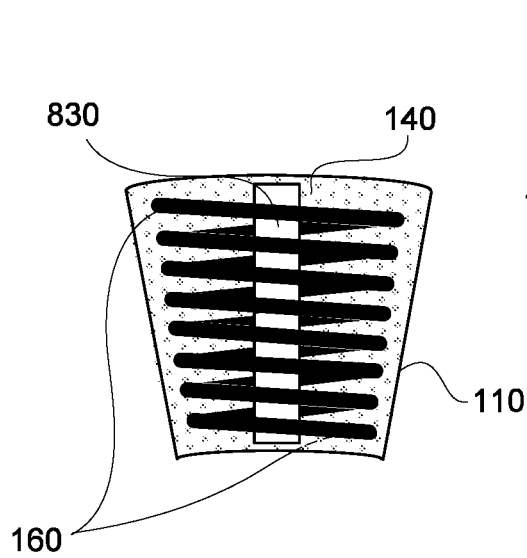
FIG. 7.3
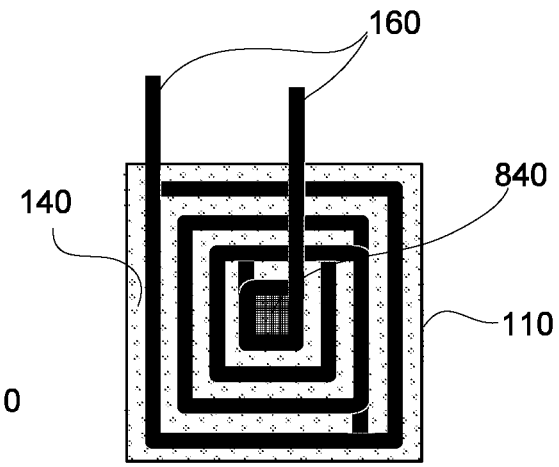
FIG. 7.4

ELECTROMAGNETIC HALBACH ARRAY, DEVICES, AND METHODS

FEDERALLY SPONSORED RESEARCH

Not applicable

SEQUENCE LISTING OR PROGRAM

Not applicable

TECHNICAL FIELD

The embodiments of the present invention relate to Halbach arrays, specifically to a novel electromagnetic device that produces a Halbach array effect (i.e. enhanced and cancelled magnetic fields) and is purposefully designed for relative ease of construction. Halbach arrays are useful in electrical devices such as motors and generators, and have many other beneficial applications.

BACKGROUND ART

The prior art that most, closely resembles the present invention are embodied in U.S. Pat. Nos. 9,302,577, 9,558,876, and 9,787,149 (all awarded to Roberto Catalan), all of which have the following attributes: a.) the winding of the electromagnetic coils are tightly packed together, b.) the core of each electromagnet is magnetically anisotropic and two-dimensional, made of (generally grain-oriented) stacked thin laminations of high silicon steel, each electromagnet therefore has distinct physical and polar boundaries, and c.) magnetic flux conduits in the shape of fork-like prongs protrude from the cores of the horizontal electromagnets to physically touch the cores of adjacent vertical electromagnets and thereby establish 'substantial contiguity' throughout the entire core, to enable the Halbach array effect.

In sharp contrast, the corresponding differences of the foregoing prior art with the present invention are, respectively: a.) the use of highly counter-intuitive, spring-shaped (i.e. relatively loosely-wound) vertical and horizontal electromagnetic coils which are arranged in Halbach array sequence, wherein each individual coil usually has one or more coils nested within it, b.) all of the electromagnetic coils are encased in varying amounts of magnetically isotropic, three-dimensional soft magnetic composite and binder (e.g. non-conductive high-temperature epoxy, phenolic resin, suitable encapsulation and potting compounds, etc.), which serves as a 'fully contiguous' unified core, generally without any visible physical and clearly delineated polar boundaries, and c.) the foregoing novel combination enables a strong Halbach effect and negates the need for fork-like prongs (e.g. the 'magnetic flux conduits' in the aforementioned prior art) which do not exist in, nor are they needed by, the present invention. As such all three aforementioned prior art are fundamentally different from the present invention.

Halbach arrays have been typically comprised of permanent magnets wherein the magnets are arranged in a manner such that the magnetic field on one side of the array is augmented or enhanced while the magnetic field on the opposite side of the array is elastically decreased or cancelled. Some references have described arrangements of ordinary electromagnets arranged in Halbach array sequence but the level of augmentation and reduction of magnetic fields achieved has been severely disabled or non-existent and therefore yielding no real advantage.

U.S. Pat. No. 5,705,902 discloses cylindrical electromagnets configured to approximate a Halbach array. Similarly, U.S. Pat. No. 5,705,902 discloses Halbach arrays within a generator. The prior art, as noted above, includes applications in which permanent magnets have been arranged in Halbach arrays sequence. Some examples include U.S. Pat. Nos. 7,540,004, 7,031,116, 6,906,446, 6,841,910 and 6,858,962. None of the examples in the prior art describe Halbach array sequences of electromagnets which produce an effective and significant enhanced magnetic field on one side of the array and proportional reduction of magnetic field on the opposite side.

OBJECTS AND ADVANTAGES

Several objects and advantages of the present invention are as follows:

a) The novel combination of loosely-wound spring-shaped electromagnetic coils with soft magnetic composite creates magnetically isotropic 'Halbach-capable' electromagnets that, when arranged in the prescribed sequence, allow uniform and uninterrupted blending of magnetic fields from adjacent electromagnetic coils which is essential to producing a strong Halbach effect.

The use of loosely-wound spring-shaped electromagnetic coils represents a substantial departure from the conventional method where electromagnetic windings are always tightly packed. Ordinary electromagnets with tightly packed windings, even if positioned as a Halbach array—cannot produce a strong Halbach effect, because tightly packed electromagnetic coils become both a physical (i.e. there is no, direct contact between vertical and horizontally arranged cores) and energized barrier preventing the magnetic flux adjacent electromagnets from combining with each other, thereby severely impairing or disabling the Halbach effect.

These 'Halbach-capable' electromagnets are perhaps the closest analogous structure (in terms of capability of producing a Halbach effect) to that of blocks of permanent magnets arranged as a Halbach array (with the exception of needing to provide power to the electromagnetic coils to generate the magnetic flux).

b) Speed of construction with no special tooling. One embodiment of the present invention where the method used is simply to immerse prepared vertical and horizontal electromagnetic coils in soft magnetic composite infused with a binder comprised of epoxy resin. This is perhaps the easiest, simplest and fastest way to construct an electromagnetic Halbach array without the need for special tools and equipment, high temperatures and compressive forces. Other embodiments described in detail herein are more complicated and will involve conventional processes.

c) 'Maximum fill' yet with Halbach effect. By nesting additional spring-like coils into every vertical and horizontal electromagnetic coil and encasing these coils in soft magnetic composites, it is possible to match or exceed the fill ratio (e.g. the amount of copper) of similarly-sized, tightly-wound electromagnetic windings around stacked laminations (essentially by taking some of the area allocated to it), without sacrificing the ability to generate a strong Halbach effect. This improved fill factor is especially true for the windings around the 'Halbach effect-capable' electromagnetic core in my own prior art.

d) Proximity and power. The present invention's electromagnetic coils are positioned and generally bound at very close proximity to each other, to a degree not possible with ordinary laminations, further contributing to a strong Halbach effect.

e) Smooth rotation, and ease of removal and reinstallation. Magnetic cogging is a result of strong permanent magnets in a rotor being attracted to the metal surfaces of the stator teeth. When starting and stopping a motor, this magnetic attraction causes juddering and rough jerky or jarring movement. In addition, some devices require that the component containing the rotor be removed relatively quickly and easily. If that same rotor has strong permanent magnets, removal and reinstallation can be not just difficult, it can also be quite dangerous. By using the novel electromagnetic Halbach arrays of the present invention as a rotor, the rotation is stronger and generally far smoother, plus removal and reinstallation (if required) is far easier, since the magnetic field can be finely tuned or turned off, respectively.

f) The present invention does not need 'magnetic flux conduits' comprised of 'protrusions or fork-like prongs' found in my own prior art, since those protrusions or prongs are only required for enabling a Halbach effect when using a two-dimensional, anisotropic laminated core.

g) Ease of assembly. The task of winding and assembling Halbach-effect capable vertical and horizontal laminated cores of my own prior art, after they are wound is complicated by the 'magnetic flux conduits' or fork-like prongs. Handled improperly, these prongs can also easily cause damage to the magnetic coils during assembly. These difficulties are reduced or completely avoided in the present invention.

h) Quick adjustability and redesign. By adjusting the number, thickness and shape of the nested spring-like coils and altering the amounts of soft magnetic composite in relation to its binder, it is possible to quickly adjust the characteristics of the electromagnetic Halbach array, reposition sensors, or generally implement a rapid change in design to suit various applications. Similar adjustments would be far more expensive, time-consuming and complicated if the core were made of ordinary laminations with copper windings.

i) Unified core supporting very complex shapes. In the present invention, even if electromagnets are made in sections, once they are assembled they still result in a single magnetically integrated core, due to the isotropic nature of soft magnetic composites. This allows for very complex shapes that would be nearly impossible to implement with standard stacked laminations.

j) Less wasteful of electromagnetic material. When laminations are used, especially in the winding of induction motors, there is a significant amount of windings outside the core (e.g. end windings). This can be avoided in the present invention, which will also reduce electrical resistance, losses, consumption and cost of manufacturing a motor or generator.

k) Paired enhanced Halbach magnetic fields. The present invention can significantly augment ordinary electric motors and generators by pairing the enhanced Halbach fields of stator and rotor together at the airgap. The construction of an example induction motor improved through the application of dual electromagnetic Halbach arrays as both a stator and rotor is detailed in the sections that follow.

DISCLOSURE OF INVENTION

The inventive subject matter disclosed herein describes a novel electromagnetic Halbach array comprised of spring-shaped electromagnetic coils encased in soft magnetic composite. Two such electromagnetic Halbach arrays, as a stator and a passive rotor are combined in a sample novel induction motor that features paired enhanced Halbach magnetic fields focused solely at the airgap.

Energy cannot be created nor destroyed, but as Klaus Halbach showed in his discovery of permanent magnet Halbach arrays in 1987, magnetic energy can be elastically reallocated. By arranging permanent magnets in the prescribed Halbach sequence, one side of the array develops an enhanced magnetic field (i.e. with around 97% of the combined magnetic energy) while the opposite side of the array has the remaining 'cancelled' magnetic field (i.e. typically around 3%).

Upon inspection, the 'enhanced' side of the permanent magnet Halbach array has groups of three similar poles on the enhanced side of the array, where the magnetic fields combine to increase the intensity and the height of the overall magnetic field as they simultaneously arc around groups of three north poles and similar groups of three south poles. Whereas on the 'cancelled' side of the array, there exists only alternating, single north and south poles, thus the arcs of the magnetic fields are much smaller, effectively becoming a magnetic fence that traps and pushes most of the combined magnetic field towards the 'enhanced' side of the Halbach array.

The aim therefore is to enable the pairing of enhanced Halbach magnetic fields of the novel electromagnetic Halbach array stator of the present invention, with another novel electromagnetic (or even permanent magnet) Halbach array rotor together (i.e. 97%+97%) at the airgap, where the work of a motor or generator is actually performed. This is in sharp contrast to combination from equal-ratio magnetic fields of ordinary rotors and stators (i.e. 50%+50% at the airgap) of conventional motors and generators.

In the case of the novel electromagnetic Halbach array induction motor (described in detail later), the aim of the present invention is to ensure that most of the magnetic energy produced (around 97%) by the electromagnetic Halbach array stator is directed at the airgap and the rotor. Further, by pairing this stator with a passive electromagnetic Halbach array rotor of the present invention (also shown later), that novel rotor will also generate and direct its own enhanced Halbach field towards the airgap and the stator once it is energized, further enhancing the capability of this 'dual' electromagnetic Halbach array induction motor.

Because the present invention allows for relatively easy and versatile construction, many different embodiments of the present invention can be tailored to address specific needs, and can likewise be quickly manufactured. The present invention will provide a multitude of benefits heretofore unrealized.

BRIEF DESCRIPTION OF DRAWINGS

FIG. 1.1 shows in profile, a transparent view of a linear electromagnetic Halbach array, highlighting the vertical and horizontal spring-shaped coils and their pitch spaces which enable the merging of magnetic flux after the coils are immersed or encased in varying amounts of soft magnetic composite and binder.

FIG. 1.2 again shows in, profile, a transparent view of an arc segment from a circular version of the electromagnetic Halbach array with spring shaped coils in FIG. 1.1.

FIG. 1.3 shows a cut-away, profile view of the same electromagnetic Halbach array in FIG. 1.1, showing an optional external custom housing and other elements which were omitted in FIG. 1.1 for the sake of clarity.

FIG. 2.1 is a perspective, transparent view of the electromagnetic Halbach array in FIG. 1.1, this time showing the nested spring-shaped electromagnetic coils immersed or encased in soft magnetic composite and its phase wire ends.

FIG. 2.2 is a close up view of the encircled portion of the vertical nested spring-shaped electromagnetic coil in FIG. 2.1, emphasizing that the pitch of both inner and outer coils are as parallel as possible to allow these electromagnetic coils to be easily immersed or encased in soft magnetic composite.

FIG. 3.1 illustrates the top, transparent view of a circular, uniquely 'Halbach-capable' electromagnet, showing nested spring-shaped electromagnetic coils which are encased in lightly compacted and mildly sintered soft magnetic composite and binder.

FIG. 3.2 shows a top, transparent view of a somewhat triangular, uniquely 'Halbach-capable' electromagnet (typically as an arc segment of a circular axial flux stator), showing its nested spring-shaped electromagnetic coils which are immersed or encased in soft magnetic composite.

FIG. 3.3 is a transparent profile view of another somewhat triangular, uniquely 'Halbach-capable' electromagnet (this time as an arc segment of a circular radial flux stator), again showing spring-shaped electromagnetic coil immersed or encased in soft magnetic composite.

FIG. 3.4 is a top, transparent view of a rectangular, uniquely 'Halbach-capable' spring-shaped nested electromagnet similar to that seen in FIG. 2.1 for a linear stator.

FIG. 5.1 is a perspective, transparent view of flat, card-like electromagnetic coils, stacked between layers of immersed, mildly processed or fully processed soft magnetic composite and binder, with the ends of each coil not yet inter-connected.

FIG. 5.2 is the same as FIG. 5.1 this time as a side, transparent view, with the ends of each flat, card-like electromagnetic coils now properly interconnected to form a unique 'Halbach-capable' electromagnet.

FIG. 6.1 is the top view of the two primary elements of a dual electromagnetic Halbach array motor or generator showing the polar orientations of an outer electromagnetic Halbach array ring which serves as a stator, and the inner electromagnetic Halbach array ring which serves as a rotor.

FIG. 6.2 illustrates a suggested winding, wiring, and termination scheme for the electromagnetic Halbach array stator that was shown as the outer ring in FIG. 6.1.

FIG. 6.3 shows a perspective, transparent view of a novel passive electromagnetic Halbach array rotor.

FIG. 6.4 shows a schematic of how the spring-shaped vertical and horizontal electromagnetic coils of a passive rotor are connected to two electromagnetic metal end rings.

FIG. 6.5 is a schematic of an active 'self excited' electromagnetic Halbach array rotor with an arrangement identical to the inner ring of FIG. 6.1.

FIG. 7.1, FIG. 7.2, FIG. 7.3 and FIG. 7.4 are hybrid forms of the 'Halbach-capable electromagnets' shown in FIG. 3.1, FIG. 3.2, FIG. 3.3 and FIG. 3A respectively. These hybrid electromagnets are designed to further enhance magnetic flux beyond the native capabilities of soft magnetic composite.

REFERENCE NUMERALS IN DRAWINGS

Figure 4:
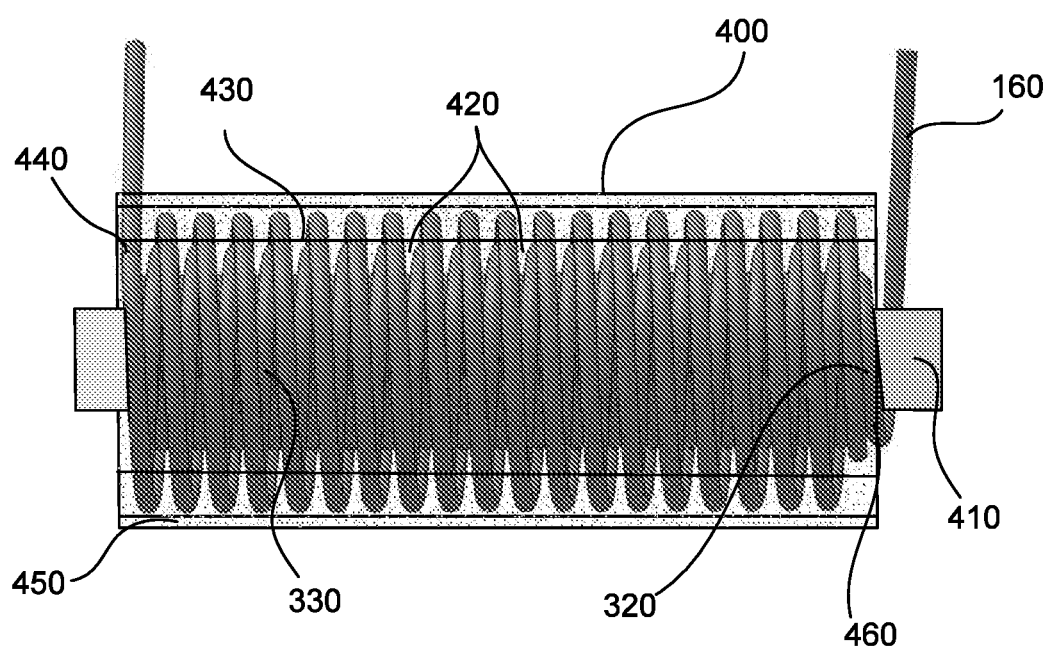
FIG. 4 shows a profile view of a circular, uniquely 'Halbach-capable' electromagnet showing nested spring-shaped electromagnetic coils being encased in sections of fully-compressed and sintered soft magnetic composite (rendered transparent in the drawings).

110 Vertical spring-shaped electromagnetic coil (not limited to copper)
120 Horizontal spring-shaped electromagnetic coil (likewise not limited to copper)
130 Pitch spaces
140 Soft magnetic composite (i.e. powdered insulated magnetic metals)
150 Binder (e.g. non-conductive high-temperature epoxy, phenolic resin, etc.)
160 Individual electromagnetic coil wire ends
210 Overhangs above each vertical electromagnetic coils
220 Coil fasteners and supports
230 Custom housing and attachment point (e.g. structural fabric pre-impregnated with epoxy)
240 Sensors (Hall sensor, sine-cosine, optical, etc.)
310 Optional nested electromagnetic coils
320 Inner electromagnetic coils in nested configuration
330 Outer electromagnetic coils in nested configuration
340 Lightly compacted and mildly sintered soft magnetic composite and binder
400 Overall assembled enclosure for nested coils of an individual electromagnet
410 Sectioned centermost core (fully compacted and sintered)
420 Ridges of winding guides
430 Sectioned outer encasement (fully compacted and sintered)
440 Coil entry and exit apertures in outer encasement
450 Outermost cover of the electromagnet (sectioned, and also fully compacted and sintered)
460 Openings for wire ends on the outermost cover
510 Flattened spiral-shaped electromagnetic coils
520 Flattened coil frames of soft magnetic composite with spiral shaped perforations
530 Layers of fully compacted and sintered soft magnetic composite
540 Wire ends of flat electromagnetic spirals
550 Connectors for ends of flat card-like spirals in the same stack
610 Outer ring-electromagnetic Halbach array as a Stator
620 Inner ring-electromagnetic Halbach array as a Rotor
630 Rotor shaft
640 Airgap of a motor (i.e. the space between the rotor and stator)
650 Grouped wire ends as Phase 'A'
660 Grouped wire ends as Phase 'B'
670 Grouped wire ends as Phase 'C'
680 Star/Wye termination for Phases A, B, and C
710 Passive electromagnetic Halbach array rotor
720 First electromagnetic metal end ring of the rotor
730 Second electromagnetic metal end ring of the rotor
810 Insulated stacked grain-oriented high-silicon steel laminations
820 Insulated wire bristles of non-insulated soft magnetic composite
830 Permanent magnet (used only for a passive rotor)
840 Non-magnetic, high-temperature mesh filled with non-insulated soft magnetic composite
850 Optional Halbach array segment isolators

DESCRIPTION OF EMBODIMENTS

Many careless motors and generators are in use today. The term careless, denotes that the center of the electromagnetic coils is empty air or any non-magnetic material (e.g. non-magnetically permeable plastic). However, because the magnetic resistance of air or non-magnetic material is a thousand times higher than laminated steel, the amount of magnetic force generated in careless design is significantly reduced.

Because an electromagnetic Halbach effect requires the blending of magnetic flux from properly arranged and energized electromagnetic coils, coreless empty air or plastic is a poor choice for the task. In sharp contrast, soft magnetic composites (e.g. powered insulated magnetic metal composite such as Somaloy™ from Hoganas, Accucore™ from TSC International, Siron™ from PMG Fussen GmbH, or AncorLam™ from GKN Sinter Metals) are perfect for combining magnetic flux due its isotropic (i.e. three dimensional) nature, and because it, can be made into very complex shapes. However, there is yet another major counter-intuitive requirement needed to enable an electromagnetic Halbach effect: loosely-wound, spring-shaped electromagnetic coils.

FIG. 1.1 is a side, cutaway view of a linear embodiment of the present invention, showing the alternating vertical 110 and horizontal 120 aforementioned loosely-wound spring-shaped electromagnetic coils (e.g. insulated magnetic copper or aluminium wire, etc., which can be purchased from MWS Wire™, Remington Industries™, Superior Essex™, etc.). Loosely-wound means that the spring-shape is not fully compressed. The included arrows denote polarity of these coils (e.g. the arrowhead is the north pole, and the tail end is the south pole), conforming with the prescribed Halbach array sequence.

Although not shown here, note that there are other kinds of spring-shapes (e.g. non-helical wave springs) which can be used instead, for as long as they are 'loose' (i.e. the apertures should be very large compared to the particle size of the soft magnetic composite) and not fully compressed. Moreover the clockwise and counterclockwise winding of each must adhere to the winding scheme of the particular application.

This diagram also shows the pitch spaces 130 created by the helical nature of these spring-shapes which, when immersed or encased in soft magnetic composite 140 which is mixed in varying amounts in relation to a binder 150 (e.g. non-conductive high temperature epoxy resin, phenolic resin, or suitable encapsulation and potting compounds, etc., which can be purchased from 3M™, Dupont™, Loctite™. The Chemical Company™, etc.) provides a pathway for magnetic flux from adjacent horizontal spring-shaped electromagnetic coils to reach into the center of the vertical spring-shaped electromagnetic coils at very close proximity, thereby enabling a strong Halbach effect.

More specifically, the term 'immersed' implies that the binder, such as the aforementioned epoxy resin is relatively abundant in relation to soft magnetic composite (i.e. the degree of 'wetting' is considered to be high) and is generally applied when no compaction, heating, or sintering is desired.

In contrast, the term 'encased' implies that there is significantly less binder in relation to soft magnetic composite (i.e. the degree of 'wetting' is considered to be low, or that phenolic resins, suitable encapsulation or potting compounds, or other kinds of binders are used instead), and is generally used when only light compaction and mild sintering of the soft magnetic composite is desired. Note that 'encased' can also mean that the binder may even be non-existent, in the case where the soft magnetic composite is fully compacted and thoroughly heated and sintered. The type of, and varying ratio between, soft magnetic composite and binder, plus the degree of processing of the same, will depend upon the requirements of the application.

Soft magnetic composite is shown as dots, while binder is rendered transparent, both seen as a simple rectangular shape in the diagram, for clarity. Also shown are the wire ends 160 of each individual electromagnetic coil. This arrangement would be suitable for a Halbach array stator of a linear motor.

FIG. 1.2 is identical to FIG. 1.1, but in a circular form, showing a partial arc segment. This would be the common configuration for electromagnetic Halbach array stators or rotors for electric motors.

It should also be noted that for electromagnetic Halbach arrays immersed or encased in soft magnetic composite, when arranged in a circular manner (e.g. as a rotor or stator or any other application), the "horizontal" electromagnetic coils are oriented with energized magnetization essentially parallel to the circumference of the circle formed by the electromagnetic Halbach array. Because the outer edge of a circle cannot form a perfectly straight line, the directions of magnetization of the horizontal electromagnetic coils are actually parallel to lines tangent to the circle. See for example, FIG. 6.1. The "vertical" electromagnetic coils are arranged with magnetization pointing outward or inward along lines extending radially from the center of the circle (again as seen in FIG. 6.1). The word "vertical" with regard to the electromagnetic coils (e.g. as a stator) generally indicates the direction of intended use towards, for example, the airgap of a motor and the magnetic flux of an 'opposing' passive electromagnetic Halbach array rotor. The terms, "horizontal" and "vertical" are therefore used as would be customary and would be familiar to a person of ordinary skill in the art and does not imply that the adjacent horizontal and vertical electromagnetic coils are arranged with magnetization perfectly perpendicular to each other in but instead, substantially perpendicular according to the circular or other required geometry of the device. For embodiments involving linear devices adjacent horizontal and vertical electromagnetic coils would be arranged with magnetization perpendicular to each other.

FIG. 1.3 provides additional detail to FIG. 1.1, now displays features which were initially omitted for the sake of clarity. Shown are optional overhangs 210 positioned at the ends of each vertical electromagnetic coil 110. These overhangs can have various shapes and can be comprised of soft magnetic composite, silicon steel laminations, or other materials, chosen depending upon the requirements of the application. The position of a few optional coil fasteners and supports 220 (which are generally made of soft magnetic composite, or 3D printed non-magnetic high-temperature plastic filament such as polycarbonate (which can be bought from Lulzbot™, E3D™, Prusa3D™, Amazon™, etc.), for binding together or for propping up and positioning adjacent coils are also revealed.

Also illustrated is a cross section of a sample custom housing and attachment point 230 which is generally composed of carbon fiber composite sandwiched between layers of non-conductive fiberglass composite (which can be procured from Fiberglase™, Rock West Composites™, Zoltek™, Hexcel™, etc.). Sample locations for sensors 240 (e.g. Hall, optical, sine-cosine, and other rotary encoders, produced by Texas Instruments™, Infineon™, Honeywell™, Baumer™, etc., which can be purchased from Digikey™, Amazon™, Mouser™, etc.) are also included.

FIG. 2.1 shows a perspective view of another embodiment present invention, highlighting the optional nested electromagnetic coils 310, within each vertical 110 and horizontal 120 spring-shaped coils. The nesting is repeated and concentric, spaced apart (again in sharp contrast to conventional winding) generally guided by the size of the composite particles and by the thickness of the insulated electromagnetic coil material used, and wound as far into the center as possible (or as required by the specific application). This nesting feature ensures maximal 'copper fill' (e.g. the amount of electromagnetic coil material), counteracting the pitch spaces 130 in the spring-shape, by consuming some of the area which would be traditionally occupied by conventional block of laminations in prior art.

These nested electromagnetic coils, which are immersed or encased in varying amounts of soft magnetic composite 140 and binder 150 (which is rendered transparent in the diagram when in front of the electromagnetic coils for clarity), enhances magnetic flux while concurrently maintaining the capability of producing a strong Halbach effect. The soft magnetic composite's complex shape (essentially a negative image of all nested electromagnetic coils) results in a unique, magnetically integrated, isotropic three-dimensional core. The wire ends 160 of each individual electromagnetic coil are also shown.

With regard to wire ends 160, 'immersed' implies that outermost coils and nested coils can be wound continuously, whereas 'encased' implies that each coil in a nested set of coils for a single electromagnet are separate, thus related ends must be joined together (e.g. soldered, welded, crimped, etc.) as needed, and re-insulated or covered to prevent shorting.

FIG. 2.2 is a close up view of the nested electromagnetic coils 310 shown in FIG. 2.1. During construction, it is important (another unobvious point of novelty) that the pitch of the outer nested coils 320 be wound as parallel as possible to the inner nested coils 330, to allow soft magnetic composite 140 and binder 150 (again rendered transparent in the drawing), to not only be easily applied, poured, injected, compacted, and solidified in between all the coils (via the pitch spaces 130 which are now readily visible), but also to ensure that all these energized coils never physically or actively block the magnetic flux from adjacent coils since the unimpeded merging of these forces is essential for enabling a strong Halbach effect.

The spring-shapes for the electromagnetic coils are important for achieving a strong Halbach effect. At first glance it would seem that the horizontal electromagnetic coils do not strictly require a spring shape (i.e. it can be tightly wound). However, if the horizontal coils were the tightly wound, those tightly wound sections when in contact with, or in the path of the soft magnetic composite of the vertical coils, will again physically and actively prevent the flux from both coils from combining in that specific area, resulting in a reduced or impaired Halbach effect in that vicinity. It is thus very important for both vertical and horizontal electromagnetic coils to have spring shapes, since it ensures that the soft magnetic composite core would be fully interleaved throughout all of the electromagnetic coils, thereby ensuring a strong Halbach effect.

Every embodiment of the present invention as seen in the drawings represent a substantial departure from the conventional method of preparing soft magnetic composite which involves extreme compacting pressures and high temperatures—achieved simply by immersing the vertical and horizontal electromagnetic coils in soft magnetic composite that is infused with a generous amount of non-conductive high-temperature epoxy binder (respective of the intended overall shape or sections of said shape) which is specified to cure at room temperature. Naturally this configuration will only be used in specific types or range of suitable applications.

There is also no need to be limited to just a single type of soft magnetic composite. There are many different kinds of soft magnetic composites (i.e. powdered insulated magnetic metals) from the different manufacturers mentioned earlier, and they offer have various kinds of insulation and adhesive coating per granule. One or more of these composites can be mixed together (i.e. insulated with non-insulated, unalloyed with alloyed, or with different particle sizes) along with different amounts (i.e. wetting) of binder (e.g. non-conductive, high temperature epoxy, phenolic resin, suitable encapsulation and potting compounds, etc.) to tailor the characteristics (e.g. increase magnetic permeability, lower hysteresis losses, AC or DC applications, better high or low frequency response, etc.) of the resulting solidified core (with varying degrees of hardness) to meet the requirements of the specific application.

To further improve inductive force or magnetic permeability, another alternative embodiment (which can be applied to every drawing) reduces the amount of binder, and the soft magnetic composite is instead very mildly and repeatedly sintered (i.e. light compaction followed by gas e.g. nitrogen and moderate heat treatment), but only to the extent that the processing does not damage the electromagnetic coils.

Shown in FIG. 3.1 is a top view of a circular nested spring-shaped vertical electromagnet 110 encased in lightly compacted and mildly sintered soft magnetic composite and binder 340.

FIG. 3.2 is similar to FIG. 3.1, this time as, a top view of a somewhat triangular nested electromagnet that generally serves, as an arc segment for an axial flux implementation.

FIG. 3.3 is again similar to FIG. 3.1, although now a roughly triangular electromagnet seen from the side, as an arc segment for a radial flux implementation (note that the nested electromagnets are hidden from view for clarity). This is almost identical to a single nested vertical coil in FIG. 1.2.

FIG. 3.4 is again similar to FIG. 3.1, but now as a rectangular nested electromagnet seen from the top view. This is almost identical to a single nested coil in FIG. 2.1. The individual coil wire ends 160 for each individual electromagnet is likewise shown.

Using FIG. 3.4 as an example, after several of these individual electromagnets are assembled and permanently bonded together with adhesive to appropriately shaped horizontal electromagnets and arranged in the prescribed Halbach array sequence, the completed electromagnetic Halbach array (if linear) will look very similar to FIG. 1.3. Generally a custom housing 230 is used to contain all the electromagnets as, a unit, to ensure adequate overall structural strength, and also to provide an attachment point.

To further enhance magnetic flux flowing through soft magnetic composite (e.g. beyond the capability of soft magnetic composite immersed in binder, or soft magnetic composite that is lightly compacted and mild sintered), full compaction, heat treatment and sintering of soft magnetic composites is required.

FIG. 4 is a cut-away profile view of an overall assembled enclosure 400 for nested coils of an individual electromagnet (a circular example is shown) which is put together in sections. Each section is usually initially created from a 3D printed negative image mould, and after correct fitment, finalized as fully compressed, heated and sintered soft magnetic composite forms). Note that soft, magnetic composite is rendered transparent, with dots, in the drawing.

Assembly begins with a sectioned centermost core 410 (which is shown whole in the drawing) to ensure proper positioning of the inner electromagnetic coil 320. After placement, two or more sections of an outer encasement 430 are joined together with adhesive to encapsulate the sectioned centermost core. This outer encasement usually has ridges 420 to align a larger diameter outer coil 330 with a correct pitch that is roughly parallel to the initial internal coil. Also shown are the entry and exit apertures 440 in the outer encasement which serve as transition points for the coils. More outer encasements are added as necessary until the desired diameter of the nested coils is reached. Finally, the sections that make up the outermost cover of the electromagnet 450 are joined together with adhesive to again fully encapsulate the exposed windings, and thereby establish the complete shape of the electromagnet, and provide the openings 460 for the wire ends 160.

It should be noted that nested coils of a single electromagnet need not be of the same phase. Multi-phase electromagnets can be implemented if required by the application. For example, instead of two wire ends 160 protruding from every electromagnet as seen in FIG. 4, six wires instead (not shown for clarity), can be used to support three phases per nested electromagnet.

It is also possible for the electromagnetic coils to be hollow (provided it has adequate circumference) to provide a passage of, for example, non-conductive mineral oil to cool the completed electromagnetic Halbach array from within, with the help of an external cooling system. This add-on feature is optional and not illustrated in the drawings for the sake of clarity.

FIG. 5.1 shows a perspective view of an alternative embodiment of the present invention, as a stack of soft magnetic composite layers of a specific shape 530 repeatedly and alternately piled on top of relatively flat card-like electromagnetic spirals 510 inserted in spiral shaped perforations of layers of (similar) soft magnetic composite 520, until the desired height (and shape) of the resulting electromagnetic stack is reached.

The soft magnetic composite used is generally fully-compacted and sintered. Soft magnetic composite, being isotropic, provides full magnetic contiguity with the soft magnetic composite layers immediately above and below it.

Each card-like spiral in the stack has two wire ends 540 extending outwards, which are provided connectors 550 shown in FIG. 5.2, to create a single electromagnetic path, with two final endpoints (i.e. a beginning and end wires 160). Once fully assembled, joined together, and properly connected, a unique 'Halbach-capable' layered electromagnet stack is created.

Each layered electromagnet stack is shaped to conform to its vertical or horizontal role. Once all the required electromagnets are completed, it is arranged and permanently joined together in the prescribed Halbach array sequence, then the beginning and end wires are connected according to a predetermined winding, wiring, and termination scheme (e.g. Star/Wye, Delta, etc.). The end result is a novel electromagnetic Halbach array device comprised of stacked card-like electromagnetic spirals interleaved between layers of soft magnetic composite.

Thereafter the whole assembly is generally installed in an optional custom housing 230 which also serves as an overall attachment point similar to that shown in FIG. 1.3.

Should a multi-phase single electromagnet be required, each stack will have instead, for example, six phase wire ends, not just two (not shown for the sake of clarity).

This flat, stacked arrangement is very well-suited for multi-material 3D printing. Every embodiment of the present invention shown here can one day be directly 3D printed in a final usable production form. For now, as mentioned earlier, it is highly recommended that all of the negative moulds of the soft magnetic composite sans electromagnetic coils (and segments thereof) for compacting, heat treatment and sintering—be 3D printed first to test for fit and accuracy.

FIG. 6.1 is a top view showing two concentric circular electromagnetic Halbach arrays of a novel induction motor. Shown is an outer Halbach array ring that serves as a stator 610, while the inner Halbach array ring functions as a passive rotor 620 shown with its rotor shaft 630. This rotor and stator, both comprised of spring shaped coils immersed or encased in soft magnetic composite, focuses nearly all of the magnetic flux each produces solely at the airgap 640 (i.e. the space between the stator and the rotor). For the sake of clarity, other components of the induction motor/generator such as the motor housing (i.e. frame or yoke), bearings, seals (i.e. gaskets and o-rings), bearing housing (i.e. end bells, end bracket end shield), bearing locks, phase wiring connectors and terminal housing, optional voltage regulation, control, starter, and safety electronics, optional cooling inlets and outlets, optional sensors, sensor wiring and sensor housing, optional fan and fan covers, optional commutator, brushes, brush holder, springs, etc., which are all assembled in a predetermined manner as needed, are not drawn.

In this example, the outer ring electromagnetic Halbach array functioning as a stator is has six vertical electromagnetic spring-shaped coils 110 and six horizontal electromagnetic spring-shaped coils 120 all immersed or encased in soft magnetic composite core 140 and binder 150 (coils are not shown and each electromagnet is only seen as virtual partitions in the drawing). Arrows denoting the Halbach array sequence are added in the drawing, in a configuration that would cause the enhanced magnetic field produced by the stator to be focused inwards towards the airgap and the rotor.

The inner ring electromagnetic Halbach array functioning as a passive rotor four vertical electromagnetic spring-shaped coils 110 and four horizontal electromagnetic spring-shaped coils 120 all likewise immersed or encased in soft magnetic composite core 140 (again only seen as virtual partitions in the drawing for clarity) and binder 150. Arrows are used to show the Halbach array sequence, configured so that the enhanced magnetic field produced by the rotor is focused outwards toward the airgap and the stator.

FIG. 6.2 shows an example winding and Star or Wye termination scheme for the stator ring 610. The vertical electromagnets 110 winding instructions are located in the outer diameter (i.e. marked as 'ABCABC'). In this example, phase wiring scheme dictates that all of the vertical electromagnetic coils will be wound in a clockwise direction. The first electromagnetic coil's (i.e. coil 'A') end wire (based on the clockwise direction around the ring) is connected to the fourth electromagnetic coil's beginning wire, and then the end wire of the fourth coil is marked as Phase 'A' 650. Likewise, the second electromagnetic coil's end wire (again based on the clockwise direction) is connected to the beginning wire of fifth electromagnetic coil and the end wire of the fifth coil is marked as Phase 'B' 660. The third electromagnetic coil's end wire is then connected to the beginning, wire of the sixth electromagnetic coil, and the end wire of the sixth coil is marked as Phase 'C' 670. Thereafter, the beginning wires of the first, second and third electromagnetic coils are joined together to comply with the Star/Wye termination 680.

The foregoing winding, wiring, and termination instructions are repeated in the same manner for the six horizontal electromagnetic coils, seen as ABCABC in the inner diameter of the stator. The horizontal coil adjacent to the first vertical coil in the clockwise direction is considered the first horizontal coil (i.e. coil 'A'). When completed, the Star/Wye termination for the vertical spring-shaped coils is joined together with the Star/Wye termination of the horizontal spring-shaped coils (for this particular example).

There are many other winding, wiring, and termination schemes (e.g. Delta, LRK, etc) and as such these will not be discussed here. Wye or Star termination is preferred in this example to avoid re-circulating currents. The choice of winding, wiring and termination scheme will ultimately depend upon the specific application.

All of the phase wires A, B, and C from both vertical and horizontal spring-shaped coils are then connected to the appropriate phase connectors on an external AC motor controller (for this particular example), which can be purchased from AC Propulsion™, SEVCON™, Manzanita Micro™, etc. The spring-shaped electromagnetic coils immersed or encased in soft magnetic composite that comprise the stator, when energized, focuses the majority, of its magnetic field (i.e. the enhanced Halbach effect) towards the airgap and rotor.

FIG. 6.3 shows a perspective view of a novel passive electromagnetic Halbach array rotor 710, with its rotor shaft 630. The vertical 110 and horizontal 120 electromagnetic coils are also shown with the first electromagnetic metal end ring 720 and second electromagnetic metal end ring 730 of the rotor that serves to connect the ends of the electromagnetic coils together (as discussed next). The soft magnetic composite 140 is likewise shown in the drawing.

FIG. 6.4 is a schematic to show how the 'four effective pole' rotor in the diagram is wound and terminated. Since the rotor has no 'phases' similar to that of a stator, the first and third vertical spring-shaped electromagnetic coils of the rotor are wound clockwise, then the second and the fourth spring-shaped vertical electromagnetic coils of the rotor are wound counterclockwise. The same winding scheme then is repeated for the four horizontal spring-shaped electromagnetic coils.

Thereafter, all of the beginning wires (respective of clockwise or counter-clockwise winding) of both vertical 110 and horizontal electromagnetic coils 120 immersed or encased in soft magnetic composite 140 (not shown in the schematic), are connected to the first electromagnetic metal end ring 720 of the rotor. Then all of the end wires of all of the same vertical and horizontal electromagnetic coils (again respective of clockwise or counter-clockwise winding) are connected to the second electromagnetic metal end ring 730 of the rotor.

Alternatively, (not shown in the diagram) to emphasize that the coils of the rotor are Halbach arrays, two more electromagnetic metal end rings (for a total of four) can be added to the rotor to further isolate horizontal and vertical electromagnetic coils into separate groups.

FIG. 6.5 is very similar to FIG. 6.4 although this time the schematic shows the suggested winding connections and components for an optional active 'self excited' electromagnetic Halbach array rotor, with an arrangement identical to the inner ring of FIG. 6.1, with connections to a wireless power transfer system (which can be bought, or assembled from parts, from Amazon™, Digikey™, Mouser™, etc). Although a passive rotor is used in the dual electromagnetic Halbach array induction motor example, the schematic for an alternative configuration with an active rotor is shown here for completeness.

The Halbach sequence arrows seen in FIG. 6.3 can, also be a reference for the layout for a purely permanent magnet Halbach array rotor, or to show the orientation of permanent magnets embedded into the soft magnetic composite to supplement the electromagnetic Halbach array coils of a 'passive' rotor. An example of a single electromagnet with a permanent magnet supplementing its magnetic flux is seen in FIG. 7.3.

Even with full compaction, heat treatment and sintering, soft magnetic composite still does not have the magnetic permeability of ordinary laminations.

FIG. 7.1, FIG. 7.2, FIG. 7.3 and FIG. 7.4 are identical to FIG. 3.1, FIG. 3.2, FIG. 3,3 and FIG. 3.4 respectively, except that they are now 'hybrid' electromagnets that combine soft magnetic composites with other suitable materials at the center of each set of spring-shaped nested coils of each electromagnet to further enhance magnetic flux beyond the native capabilities of soft magnetic composite. Because the additional material is only at the very center, and the soft magnetic composite still surrounds each electromagnet, the new configuration still allows for a strong Halbach effect to be created.

For example, in FIG. 7.1, insulated stacked grain-oriented high-silicon steel laminations 810 are now found at the center of the electromagnet. For FIG. 7.2, insulated wire bristles comprised of non-insulated soft magnetic composite 820 are positioned at the center of the electromagnet. In FIG. 7.3, a permanent magnet 830 at the center of the electromagnet, but this is strictly for 'passive' electromagnets of Halbach array rotor only. Finally in FIG. 7.4, a non-magnetic, high-temperature mesh filled with non-insulated soft magnetic composite 840 at the center of the electromagnet. These hybrid configurations are all intended to help overcome shortcomings of soft magnetic composites due to its nature as insulated powdered granules.

Figure 8:
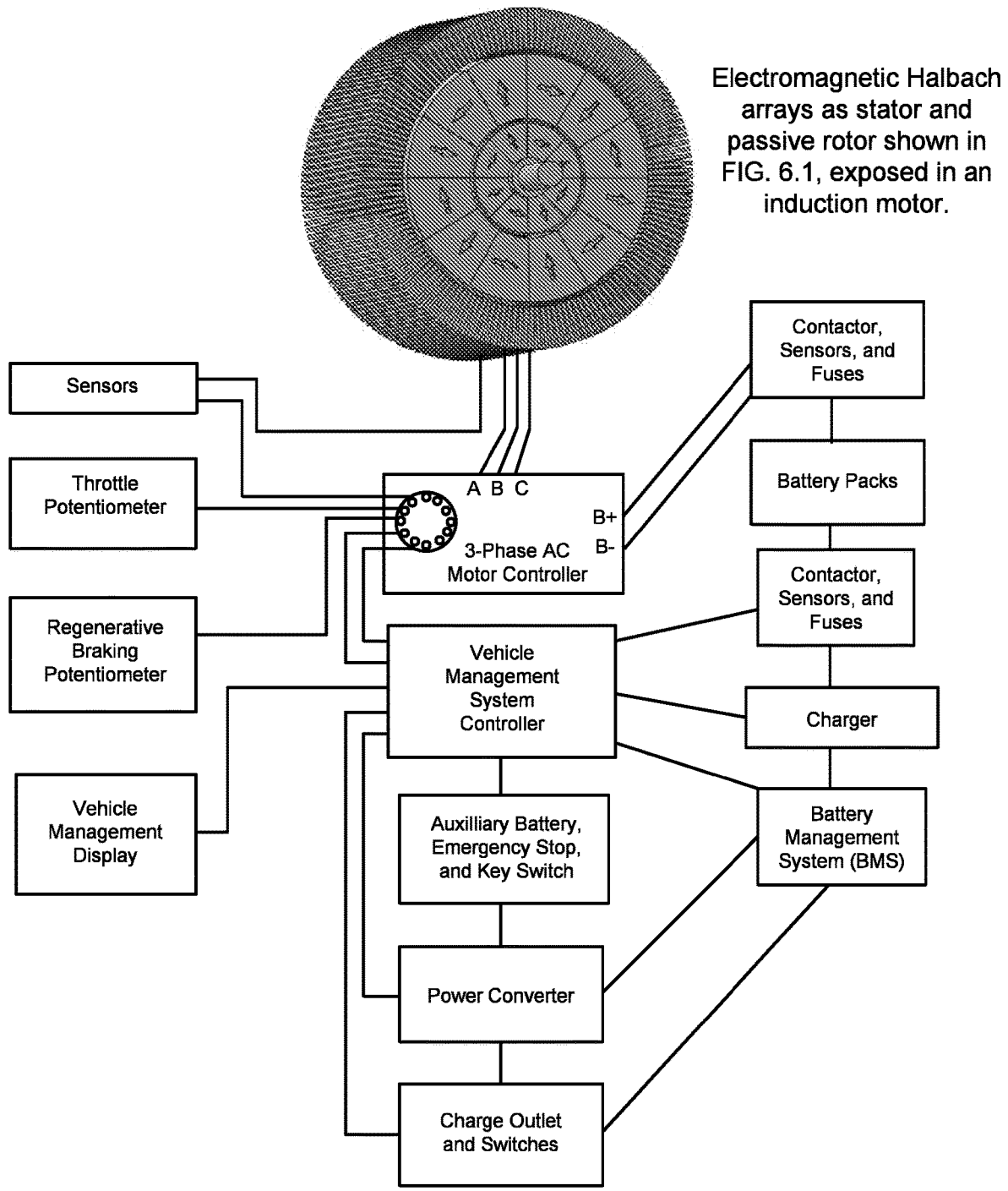
FIG. 8 shows the sample dual electromagnetic Halbach array induction motor of the present invention and how it is typically connected to the components of an electric vehicle.

FIG. 8 offers for the sake of completeness, a diagram showing how (the two concentric electromagnetic Halbach arrays as a passive rotor and a stator of) a dual, purely electromagnetic Halbach array induction motor or generator (i.e. with no permanent magnets) is connected to the components of an electric vehicle.

Figure 9:
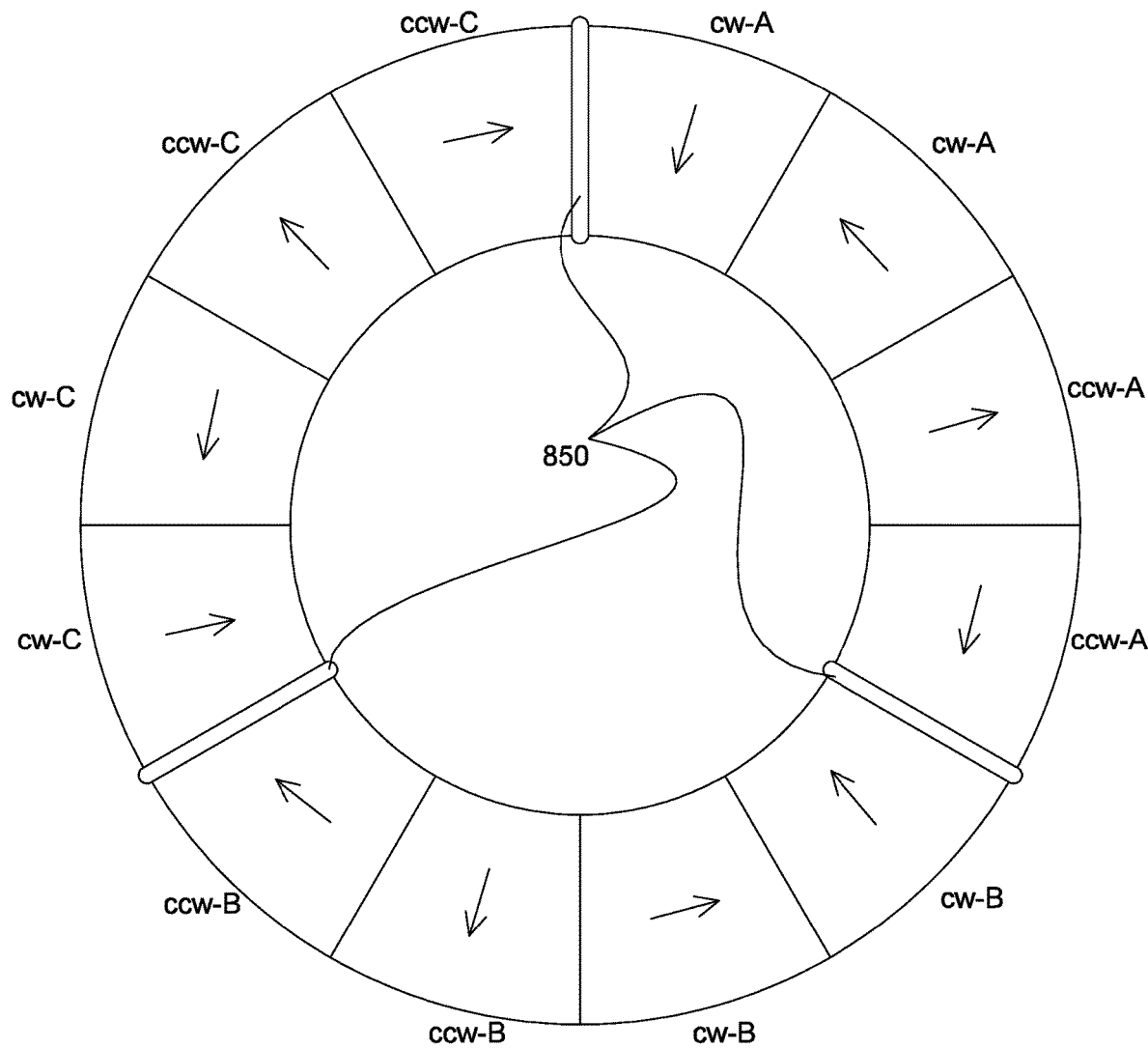
FIG. 9 shows where optional Halbach array segment isolators can be located in an alternative embodiment of the present invention to divide a circular electromagnetic Halbach array stator into three effective segments.

FIG. 9 shows the use of optional segment isolators 850 in an alternative embodiment of a circular electromagnetic Halbach array stator. When required by a specific application, the electromagnetic Halbach array stator can be divided, for example, into three separate Halbach array segments through the use of these segment isolators for instances where any energy flowing into a de-energized Halbach array stator phase is not desired in a specific application.

The winding instruction ('cw' is clockwise, and 'ccw' is counterclockwise) for each of the three phases A, B, and C, is found in the outer diameter of the stator ring. Note that in this specific configuration, the dual-sided feature of the electromagnetic Halbach array stator is disabled, since vertical and horizontal cods in each phase are wired together.

OPERATION—BEST MODE FOR CARRYING OUT THE INVENTION

Any properly assembled electromagnet only needs to be correctly connected to a power source (such as a battery) to generate a magnetic field. The individual electromagnets of the present invention are no different. However, the hallmark of a true electromagnetic Halbach array stator such as that found in FIG. 2.1 and FIG. 6.2 is that the direction of the enhanced Halbach magnetic field can be controlled. Thus, when harnessed as a stator, both 'vertical' surfaces of the stator can be used to power two sets of rotors one at a time when required. The rotors respectively positioned at the outer and inner diameter of the stator, can be of any kind—active, passive, Halbach array or not.

This dual-sided feature of an electromagnetic Halbach array stator requires that the vertical 110 and horizontal 120 spiral-shaped electromagnetic coils (immersed or encased in isotropic soft magnetic composite) have separated (generally two sets of three) phase wirings which are ultimately connected to two separate electric motor controllers (or a single motor controller with two sets of phase outputs).

In our specific example seen in FIG. 8 however, the novel induction motor of the present invention only requires a single three-phase AC motor controller which is connected to a power source (such as a battery, converter, or fuel cell) to energize the electromagnetic Halbach array stator seen as the outer ring in FIG. 6.1.

The beginning wires of both vertical and horizontal electromagnetic coils on the stator are connected together (if using a Star/Wye termination), and then each similar A, B, and C phase wire ends for both vertical and horizontal coils of the stator are grouped together and connected to the appropriate phase connectors on an AC motor controller. Wires originating from sensors will likewise be connected to the AC motor controller, if equipped. DC controllers and other kinds of motor controllers can also be used, depending upon the specific motor design and the intended application.

The initial polarity of the horizontal coils should be strictly in accordance with the FIG. 6.1 or else the enhanced magnetic field of the Halbach stator is might, be focused outwards rather than to the airgap and rotor. Once the default polarity of the horizontal coils is properly set in the three phase AC motor controller, commutation can proceed as usual.

The unique passive electromagnetic Halbach array rotor is energized by the magnetic fields emanating, from the activated stator. Various sensors 240 (Hall and optical sensors, etc.) can optionally be embedded into the stator (an example of which is seen in FIG. 1.3, although other locations for these sensors—such as on the rotor shaft, are possible) to further refine the control over the rotor's speed and torque.

FIG. 8 also shows how the dual electromagnetic Halbach array induction motor of the present invention is ultimately inter-connected with other components of an electric vehicle (such as an accelerator pedal for modulating the speed of the motor), for completeness.

CONCLUSION, RAMIFICATIONS AND SCOPE

For more than 130 years (i.e. the era of Nikola Tesla), electric motors and generators have been limited to equal-ratio (i.e. 50% north pole, 50% south pole) magnetics, which by necessity, causes a huge amounts of magnetic energy that is facing away from the airgap (i.e. the space between the rotor and the stator) to be inefficiently used or wasted outright.

If you observe closely how the coils of wire in the stator of an induction motor are wound, half of the magnetic energy that each bundle of magnetic coil produces is pointed away from the airgap. The redirection, focusing and harnessing of this already available but otherwise wasted magnetic energy is the main purpose of the present invention.

By using two electromagnetic Halbach arrays of the present invention as the stator and rotor of an induction motor (as presented here) we are able to truly harness every last 'ounce' of magnetic energy to the limit of known Halbach array physics. With the present invention, 97% of the enhanced magnetic flux produced by an electromagnetic Halbach array stator is now focused and concentrated inside the induction motor, and only 3% of magnetic energy is wasted (as compared to the 50% magnetic energy lost by the stator of an ordinary induction motor).

When ordinary squirrel cage rotors (with bars connected to two end rings) are energized, an equal-ratio magnetic field is produced around the aforementioned bars, and the rotor begins rotating. In sharp contrast, when this novel passive electromagnetic Halbach array rotor is fully energized, it also generates its own enhanced Halbach array magnetic field which is pointed towards the stator, thereby further increasing the intensity of its rotation.

By limiting wasted magnetic energy to an absolute minimum through the use of Halbach arrays, there is a significant increase in magnetic force made available to perform useful work.

Moreover, rare earth metals used to manufacture permanent magnets are currently being hoarded by countries from which they are sourced. As such, the long-term availability and affordability of exotic permanent magnets such as neodymium is questionable. As such finding ways to improve the performance of electric motors and generators without using rare earth permanent magnets is critical.

Today, nearly half of the electrical energy produced worldwide is consumed by electric motors and generators. Mankind consumes nine terawatts of electrical energy annually (and consequently a significant amount of the Earth's limited resources every year). As such, any additional efficiency that can be squeezed out of electric motors or generators is clearly of tremendous value especially for future generations yet to be born.

The dual electromagnetic Halbach array stator and rotor presented here as a unique induction motor may very well be the first fundamental improvement to induction motors in 130 years.

The technology presented here for the creation of electromagnetic Halbach arrays using nested spring-shaped electromagnetic coils immersed or encased in soft magnetic composite has a multitude of applications beyond electric motors and generators.

The capabilities of powdered metallurgy, adhesives, plasma coating, structural fabrics, multi-axis CNC machining, and three dimensional printing are continually expanding. New opportunities abound.

For example, it is now possible to 3D print (e.g. tuned selective laser sintering) an entire stator core for every embodiment of the present invention in soft magnetic composite, line the pathways for the coils with very high temperature plasma coating, and then pour or pump pure melted copper into the same pathways to reduce or remove the complexity, or even the necessity of winding process and core reassembly completely. This is yet another method for producing the present invention.

The examples provided herein are just a glimpse of the manifold uses and applications of the present inventive subject matter.

INDUSTRIAL APPLICABILITY

The industrial applicability of the electromagnetic devices disclosed herein should be self-evident.

I claim:

1. An electromagnet comprising,
   either an electromagnetic coil or a plurality of nested electromagnetic coils,
   said electromagnetic coil or said plurality of nested electromagnetic coils being comprised of an electrical conductor,
   said electromagnetic coil or said plurality of nested electromagnetic coils,
   wherein said electromagnetic coil or said plurality of nested electromagnetic coils are uncompressed, the coils further having turns, with said turns further being evenly spaced and having generally helical or wave-like pitch,
   wherein either
   a) said electromagnetic coil having wire ends and having predetermined clockwise or counter-clockwise winding, or
   b) said plurality of nested electromagnetic coils that are either joined together or continuous with predetermined clockwise or counter-clockwise winding, and further wherein said plurality of nested electromagnetic coils are spaced apart at approximately even distances,
   a magnetic composite, said magnetic composite being comprised of a magnetically isotropic material,
   wherein said electromagnetic coil or said nested electromagnetic coils are encased or embedded in said magnetic composite and further wherein said wire ends are exposed.

2. A hybrid electromagnet comprising,
   either a magnetically anisotropic center or a permanent magnet center, wherein either,
   a) said magnetically anisotropic center is comprised of either silicon steel laminations or isolated strands or layers of non-insulated magnetic composite, or
   b) said permanent magnet center is comprised of either one permanent magnet or a plurality of permanent magnets,
   wherein said magnetically anisotropic center or said permanent magnet center is centrally positioned within said electromagnet of claim 1,
   wherein said magnetically anisotropic center or said permanent magnet center is enclosed or embedded with said electromagnetic coil or said plurality of nested electromagnetic coils in said magnetic composite with said wire ends exposed.

3. An electromagnetic Halbach array comprising,
   a first plurality of electromagnets, said first plurality of electromagnets oriented vertically, each electromagnet of said first plurality of electromagnets comprised of the hybrid electromagnet according to claim 2, the electromagnets of said first plurality of electromagnets each having a first predetermined shape,
   a second plurality of electromagnets, said second plurality of electromagnets oriented horizontally, each electromagnet of said second plurality of electromagnets comprised of the hybrid electromagnet according to claim 2, the electromagnets of said second plurality of electromagnets each having a second predetermined shape,
   each said electromagnet from said first plurality of electromagnets and each said electromagnet from said second plurality of electromagnets alternately and adjacently arranged in a Halbach sequence, with clockwise or counter-clockwise coil winding direction,
   said electromagnets in Halbach sequence assembled and joined as an electromagnetic Halbach array,
   wherein said wire ends of each said electromagnet in said electromagnetic Halbach array are either grouped, joined, terminated, and connected according to a predetermined wiring scheme to produce an active enhanced Halbach electromagnetic field when energized, or shorted in a predetermined manner to form a passive enhanced Halbach electromagnetic field when energized by an external magnetic field.

4. An electromagnetic Halbach array comprising,
   a first plurality of electromagnets, said first plurality of electromagnets oriented vertically, each electromagnet of said first plurality of electromagnets comprised of the electromagnet according to claim 1, the electromagnets of said first plurality of electromagnets each having a first predetermined shape,
   a second plurality of electromagnets, said second plurality of electromagnets oriented horizontally, each electromagnet of said second plurality of electromagnets comprised of the electromagnet according to claim 1, the electromagnets of said second plurality of electromagnets each having a second predetermined shape,
   each said electromagnet from said first plurality of electromagnets and each said electromagnet from said second plurality of electromagnets alternately and adjacently arranged in a Halbach sequence with appropriate clockwise or counter-clockwise coil winding direction,
   said electromagnets in Halbach sequence assembled and joined as an electromagnetic Halbach array,
   wherein said wire ends of each said electromagnet in said electromagnetic Halbach array are either grouped, joined, terminated, and connected according to a predetermined wiring scheme to produce an active enhanced Halbach electromagnetic field when energized, or shorted in a predetermined manner to form a passive enhanced Halbach electromagnetic field when energized by an external magnetic field.

5. A segmented electromagnetic Halbach array device comprising,
   a plurality of n segment isolators, wherein n is either two or three,
   a plurality of n electromagnetic Halbach arrays according to claim 4,
   wherein said segment isolators are positioned such that said Halbach array device is comprised of joined n electromagnetic Halbach array segments, with said n electromagnetic Halbach array segments being comprised of said n electromagnetic Halbach arrays,
   wherein said electromagnetic Halbach array segments are wired such that selected array segments can be energized and de-energized according to a predetermined scheme.

6. An electromagnetic Halbach array stator comprising,
   an electromagnetic Halbach array according to claim 4,
   said electromagnetic Halbach array having a first side and a second side,
   said wire ends of each said electromagnet in said electromagnetic Halbach array grouped, joined, terminated, and connected according to a predetermined wiring scheme to produce said enhanced Halbach electromagnetic field; said active enhanced Halbach electromagnetic field selectably directed from said first side to said second side of said electromagnetic Halbach array and vice versa when energized.

7. The electromagnetic Halbach array stator according to claim 6 further comprising,
   one or more sensors affixed to or embedded in said stator.

8. A subcombination for use in an electric motor or generator, said subcombination comprising, a stator, said stator comprising a first electromagnetic Halbach array, the first electromagnetic Halbach array according to claim 4, said stator further comprising means for attaching to the electric motor or generator, wherein said grouped, joined and terminated wire ends of each said electromagnet of said first electromagnetic Halbach array are connected to an electrical and control system of the motor or generator, thereby producing said active enhanced Halbach electromagnetic field when energized, a rotor, said rotor comprising a second electromagnetic Halbach array, the second electromagnetic Halbach array according to claim 4, said rotor further comprising means for moveable attachment to the electric motor or generator, said wire ends of each said electromagnet of said rotor shorted in said predetermined manner to form said passive enhanced Halbach electromagnetic field when energized by said stator, wherein said enhanced Halbach array fields of the stator and rotor are paired.

9. A subcombination for use in an electric motor or generator, said subcombination comprising, a stator
said stator comprising a first electromagnetic Halbach array, the first electromagnetic Halbach array according to claim 4,
said stator further comprising means for attaching to the electric motor or generator,
wherein said grouped, joined and terminated wire ends of each said electromagnet of said first electromagnetic Halbach array are connected to an electrical and control system of the motor or generator thereby producing said active enhanced Halbach electromagnetic field when energized, a rotor,
said rotor comprising a second electromagnetic Halbach array, the second electromagnetic Halbach array according to claim 4,
said rotor further comprising means for moveable attachment to the electric motor or generator,
wherein said grouped, joined and terminated wire ends of each said electromagnet of said rotor are connected to a power source from the electric motor or generator thereby producing said active enhanced Halbach electromagnetic field when energized, wherein said enhanced Halbach array electromagnetic fields of the stator and rotor are paired.

10. A subcombination for an electric motor or generator, said subcombination comprising, a stator,
said stator comprised of said an electromagnetic Halbach array according to claim 4, said stator further comprising means for attaching to the electric motor or generator,
wherein said grouped, joined and terminated wire ends of each said electromagnet of said electromagnetic Halbach array are connected to an electrical and control system of the motor or generator thereby producing said active enhanced Halbach array electromagnetic field when energized, a permanent magnet rotor, said permanent magnet rotor having a permanent magnet Halbach array producing an enhanced Halbach permanent magnet magnetic field, wherein said stator is configured to be used in combination with said permanent magnet rotor, wherein the enhanced Halbach array electromagnetic field of the stator and the enhanced Halbach permanent magnet magnetic field of the rotor are paired.

11. A subcombination for an electric motor or generator, said subcombination comprising, a stator,
said stator comprised of an electromagnetic Halbach array according to claim 4, said stator further comprising means for attaching to the electric motor or generator,
wherein said grouped, joined and terminated wire ends of each said electromagnet of said electromagnetic Halbach array are connected to an electrical and control system of the motor or generator thereby producing said active enhanced Halbach electromagnetic field when energized, a rotor, wherein said stator is configured to be used in combination with said rotor, wherein said active enhanced Halbach electromagnetic field of the stator is directed at the rotor.

12. An electromagnet comprising, a plurality of flat spiral electromagnetic coils, wherein each spiral electromagnetic coil of said plurality of flat spiral electromagnetic coils has a plurality of turns, wherein the electromagnetic coils of said plurality of flat spiral electromagnetic coils are comprised of an electrical conductor, each said flat spiral electromagnetic coil stacked on top of each other, to form a stack of flat spiral electromagnetic coils, wherein each said flat spiral electromagnetic coil is approximately aligned and spaced apart at a predetermined distance between neighboring coils within the stack, wherein the flat spiral turns of each said flat spiral electromagnetic coil within said stack are uncompressed, said stack of flat spiral electromagnetic coils having wire ends that are either joined together or continuous with predetermined clockwise or counter-clockwise winding, a magnetic composite, said magnetic composite being comprised of a magnetically isotropic material, said stacked flat spiral electromagnetic coils encased or embedded in said magnetic composite, wherein said wire ends are exposed.

13. A hybrid electromagnet comprising, either a magnetically anisotropic center or a permanent magnet center, wherein either,
 a) said magnetically anisotropic center is comprised of either silicon steel laminations or isolated strands or layers of non-insulated magnetic composite, or
 b) said permanent magnet center is comprised of either one permanent magnet or a plurality of permanent magnets, wherein said magnetically anisotropic center or said permanent magnet center is centrally positioned within the electromagnet of claim 12, wherein said magnetically anisotropic center or said permanent magnet center is enclosed or embedded with said stacked flat spiral electromagnetic coils in said magnetic composite with said wire ends exposed.

14. An electromagnetic Halbach array comprising, a first plurality of electromagnets, said first plurality of electromagnets oriented vertically, each electromagnet of said first plurality of electromagnets comprised of the hybrid electromagnet according to claim 13, the electromagnets of said first plurality of hybrid electromagnets each having a first predetermined shape, a second plurality of electromagnets, said second plurality of electromagnets oriented horizontally, each electromagnet of said second plurality of electromagnets comprised of the hybrid electromagnet according to claim 13, the electromagnets of said second plurality of hybrid electromagnets each having a second predetermined shape, each said electromagnet from said first plurality of hybrid electromagnets and each said electromagnet from said second plurality of hybrid electromagnets alternately and adjacently arranged in a Halbach sequence, with clockwise or counter-clockwise flat spiral coil winding direction, said electromagnets in Halbach sequence assembled and joined as an electromagnetic Halbach array, wherein said wire ends of each said electromagnet in said electromagnetic Halbach array are either grouped, joined, terminated, and connected according to a predetermined wiring scheme to produce an active enhanced Halbach electromagnetic field when energized, or shorted in a predetermined manner to form a passive enhanced Halbach electromagnetic field when energized by an external magnetic field.

15. An electromagnetic Halbach array comprising, a first plurality of electromagnets, said first plurality of electromagnets oriented vertically, each electromagnet of said first plurality of electromagnets comprised of the electromagnet according to claim 12, the electromagnets of said first plurality of electromagnets each having a first predetermined shape, a second plurality of electromagnets, said second plurality of electromagnets oriented horizontally, each electromagnet of said second plurality of electromagnets comprised of the electromagnet according to claim 12, the electromagnets of said second plurality of electromagnets each having a second predetermined shape, each said electromagnet from said first plurality of electromagnets and each said electromagnet from said second plurality of electromagnets alternately and adjacently arranged in a Halbach sequence, with clockwise or counter-clockwise flat spiral coil winding direction, said electromagnets in Halbach sequence assembled and joined as an electromagnetic Halbach array, wherein said wire ends of each said electromagnet in said electromagnetic Halbach array are either grouped, joined, terminated, and connected according to a predetermined wiring scheme to produce an active enhanced Halbach electromagnetic field when energized, or shorted in a predetermined manner to form a passive enhanced Halbach electromagnetic field when energized by an external magnetic field.

16. A segmented electromagnetic Halbach array device comprising, a plurality of n segment isolators, wherein n is either two or three, a plurality of n electromagnetic Halbach arrays according to claim 15, wherein said segment isolators are positioned such that said Halbach array device is comprised of joined n electromagnetic Halbach array segments, with said n electromagnetic Halbach array segments being comprised of said n electromagnetic Halbach arrays, wherein said electromagnetic Halbach array segments are wired such that selected array segments can be energized and de-energized according to a predetermined scheme.

17. An electromagnetic Halbach array stator comprising, an electromagnetic Halbach array according to claim 15, said electromagnetic Halbach array having a first side and a second side, said wire ends of each said electromagnet in said electromagnetic Halbach array grouped, joined, terminated, and connected according to a predetermined wiring scheme to produce said active enhanced Halbach electromagnetic field; said active enhanced Halbach electromagnetic field selectably directed from said first side to said second side of said electromagnetic Halbach array and vice versa when energized.

18. The electromagnetic Halbach array stator according to claim 17 further comprising, one or more sensors affixed to or embedded in said stator.

19. A subcombination for use in an electric motor or generator, said subcombination comprising, a stator, said stator comprising a first electromagnetic Halbach array, the first electromagnetic Halbach array according to claim 15, said stator further comprising means for attaching to the electric motor or generator, wherein said grouped, joined and terminated wire ends of each said electromagnet of said first electromagnetic Halbach array are connected to an electrical and control system of the motor or generator and to a power source, thereby producing said active enhanced Halbach electromagnetic field when energized, a rotor, said rotor comprising a second electromagnetic Halbach array, the second electromagnetic Halbach array according to claim 15, said rotor further comprising means for moveable attachment to the electric motor or generator, said wire ends of each said electromagnet of said rotor shorted in said predetermined manner to form said passive enhanced Halbach electromagnetic field when energized by said stator, wherein said enhanced Halbach array electromagnetic fields of the stator and rotor are paired.

20. A subcombination for use in an electric motor or generator, said subcombination comprising, a stator said stator comprising a first electromagnetic Halbach array, the first electromagnetic Halbach array according to claim 15, said stator further comprising means for attaching to the electric motor or generator, wherein said grouped, joined and terminated wire ends of each said electromagnet of said first electromagnetic Halbach array are connected to an electrical and control system of the motor or generator thereby producing said active enhanced Halbach electromagnetic field when energized, a rotor, said rotor comprising a second electromagnetic Halbach array, the second electromagnetic Halbach array according to claim 15, said rotor further comprising means for moveable attachment to the electric motor or generator, wherein said grouped, joined and terminated wire ends of each said electromagnet of said rotor are connected to a power source from the electric motor or generator thereby producing said active enhanced Halbach electromagnetic field when energized, wherein said enhanced Halbach array electromagnetic fields of the stator and rotor are paired.

21. A subcombination for an electric motor or generator, said subcombination comprising, a stator, said stator comprised of said an electromagnetic Halbach array according to claim 15, said stator further comprising means for attaching to the electric motor or generator, wherein said grouped, joined and terminated wire ends of each said electromagnet of said electromagnetic Halbach array are connected to an electrical and control system of the motor or generator thereby producing said active enhanced Halbach array electromagnetic field when energized, a permanent magnet rotor, said permanent magnet rotor having a permanent magnet Halbach array producing an enhanced Halbach permanent magnet magnetic field, wherein said stator is configured to be used in combination with said permanent magnet rotor, wherein the enhanced Halbach array electromagnetic field of the stator and the enhanced Halbach permanent magnet magnetic field of the rotor are paired.

22. A subcombination for an electric motor or generator, said subcombination comprising, a stator, said stator comprised of an electromagnetic Halbach array according to claim 15, said stator further comprising means for attaching to the electric motor or generator, wherein said grouped, joined and terminated wire ends of each said electromagnet of said electromagnetic Halbach array are connected to an electrical and control system of the motor or generator thereby producing said enhanced Halbach electromagnetic field when energized, a rotor, wherein said stator is configured to be used in combination with said rotor, wherein said enhanced Halbach electromagnetic field of the stator is directed at the rotor.

23. A method for creating a Halbach-effect capable electromagnet comprising, winding a plurality of flat spiral electromagnetic coils, wherein the electromagnetic coils are comprised of an electrical conductor, stacking each said flat spiral electromagnetic coil on top of each other, said coils either continuously or as joined segments having either a clockwise or counter-clockwise direction and at least two wire ends, aligning and spacing each said electromagnetic coil evenly within said stack, encasing or embedding said stack of electromagnetic coils in a magnetic composite, said magnetic composite being comprised of an isotropic electromagnetic material, wherein said encasing or embedding step leaves the coil wire ends exposed.

24. A method for creating a hybrid Halbach-capable electromagnet comprising, the method for creating a Halbach-effect capable electromagnet according to claim 23 further comprising, assembling either magnetically anisotropic centers or permanent magnet centers; said magnetically anisotropic centers either comprised of silicon steel laminations or isolated layers or strands of non-insulated magnetic composite; said permanent magnet centers comprised of a permanent magnet or a plurality of permanent magnets, positioning said magnetically anisotropic centers or permanent magnet centers at the center of said stack of electromagnetic coils, and encasing or embedding said magnetically anisotropic centers or permanent magnet centers and said stack of electromagnetic coils together in said magnetic composite with said wire ends exposed.

25. A method for creating an electromagnetic Halbach array comprising, assembling a first plurality of electromagnets, each electromagnet from said first plurality of electromagnets made according to the method in claim 23, with each electromagnet in said first plurality of electromagnets having said first predetermined shape and oriented vertically, assembling a second plurality of electromagnets, each electromagnet from said second plurality of electromagnets made according to the method in claim 23, with each said electromagnet in said second plurality of electromagnets having said second predetermined shape and oriented horizontally, joining each said electromagnet from said first and said second plurality of electromagnets in an alternating manner with clockwise and counter-clockwise winding direction appropriate for the Halbach array sequence, covering or supporting said joined electromagnets in Halbach array sequence with epoxy impregnated fabrics or other materials to provide additional support, grouping, joining, terminating, and connecting according to a predetermined wiring scheme each said wire end of each said electromagnet in Halbach array sequence to generate an active enhanced Halbach array electromagnetic field when energized, or shorting each said wire end of each said electromagnet in Halbach array sequence in a predetermined manner to generate a passive enhanced Halbach array electromagnetic field when energized by an external magnetic field.

\* \* \* \* \*